(12) United States Patent
Nishimura et al.

(10) Patent No.: US 9,244,258 B2
(45) Date of Patent: Jan. 26, 2016

(54) OMNIDIRECTIONAL IMAGING SYSTEM

(75) Inventors: Akio Nishimura, Osaka (JP); Tetsuro Okuyama, Osaka (JP); Yasushi Yagi, Hyogo (JP)

(73) Assignee: PANASONIC CORPORATION, Osaka (JP)

( * ) Notice: Subject to any disclaimer, the term of this patent is extended or adjusted under 35 U.S.C. 154(b) by 1010 days.

(21) Appl. No.: 13/391,667

(22) PCT Filed: Jun. 24, 2011

(86) PCT No.: PCT/JP2011/003615
§ 371 (c)(1),
(2), (4) Date: Feb. 22, 2012

(87) PCT Pub. No.: WO2011/161973
PCT Pub. Date: Dec. 29, 2011

(65) Prior Publication Data

US 2012/0147183 A1    Jun. 14, 2012

(30) Foreign Application Priority Data

Jun. 24, 2010 (JP) .................................. 2010-144297

(51) Int. Cl.
*H04N 7/18* (2006.01)
*G02B 13/06* (2006.01)
(Continued)

(52) U.S. Cl.
CPC .............. *G02B 13/06* (2013.01); *G02B 17/061* (2013.01); *G03B 37/06* (2013.01); *H04N 5/2259* (2013.01); *H04N 5/23238* (2013.01)

(58) Field of Classification Search
CPC ......... H04N 7/181; H04N 7/183; H04N 7/18; H04N 7/188; G08B 13/19656
USPC .......................................................... 348/143
See application file for complete search history.

(56) References Cited

U.S. PATENT DOCUMENTS 6,130,783 A  10/2000  Yagi et al.
7,837,330 B2  11/2010  Montgomery et al.
(Continued)

FOREIGN PATENT DOCUMENTS

JP          3523783      4/2004
JP       2005-234224     9/2005
(Continued)

OTHER PUBLICATIONS

C. Lawrence Zitnick et al., "*High-Quality Video View Interpolation Using a Layered Representation*", ACM SIGGRAPH, Aug. 2004, pp. 600-608.
(Continued)

*Primary Examiner* — William C Vaughn, Jr.
*Assistant Examiner* — Daniel Tekle
(74) *Attorney, Agent, or Firm* — Wenderoth, Lind & Ponack, L.L.P.

(57) ABSTRACT

To enable an image with no blind spot area to be obtained while ensuring a wide field of view, an omnidirectional imaging system includes: a primary mirror (101) including a hyperbolic mirror; a plurality of secondary mirrors (102) arranged around the primary mirror and each including a hyperbolic mirror; and a camera (104) that captures an image reflected by the primary mirror and images reflected by the plurality of secondary mirrors. A hyperboloid of the primary mirror and hyperboloids of the plurality of secondary mirrors have a substantially coincident outer focal point, and the camera (104) is placed so that a viewpoint of the camera substantially coincides with the outer focal point of the hyperboloid of the primary mirror (101) and the hyperboloids of the plurality of secondary mirrors (102), the viewpoint of the camera being an entrance pupil position of a lens attached to the camera (104).

24 Claims, 24 Drawing Sheets

(51) Int. Cl.
*G02B 17/06* (2006.01)
*G03B 37/06* (2006.01)
*H04N 5/225* (2006.01)
*H04N 5/232* (2006.01)

(56) References Cited

U.S. PATENT DOCUMENTS

| | | |
|---|---|---|
| 7,952,606 B2 | 5/2011 | Kweon et al. |
| 8,004,560 B2 | 8/2011 | Sato et al. |
| 2006/0268103 A1 | 11/2006 | Kweon et al. |
| 2009/0034086 A1* | 2/2009 | Montgomery ......... G03B 35/10 359/629 |
| 2010/0128116 A1 | 5/2010 | Sato et al. |
| 2010/0201795 A1 | 8/2010 | Sato et al. |
| 2011/0214082 A1* | 9/2011 | Osterhout et al. ............ 715/773 |

FOREIGN PATENT DOCUMENTS

| | | |
|---|---|---|
| JP | 2006-220603 | 8/2006 |
| JP | 2006-330735 | 12/2006 |
| JP | 2008-537157 | 9/2008 |
| JP | 2009-134517 | 6/2009 |
| JP | 2010-181826 | 8/2010 |
| WO | 2006/112536 | 10/2006 |
| WO | 2009/057409 | 5/2009 |

OTHER PUBLICATIONS

Motonobu Tonomura, "*Research on fisheye lenses introduced into cars—Comparison and Interconversion Method in A Variety of Projection Schemes-*", Dai Nippon Printing Co., Ltd., Electronic Module Development Center, Design Wave Magazine, Sep. 2008, pp. 111-125, with English translation.

International Search Report issued Sep. 27, 2011 in International (PCT) Application No. PCT/JP2011/003615.

* cited by examiner (a) Primary mirror  (b) Secondary mirror

Perspective view

Hyperbolic mirrors (secondary mirrors) only

Captured image

Fisheye lenses
(perspective view)

Captured image x 4

Fisheye lenses

US 9,244,258 B2

OMNIDIRECTIONAL IMAGING SYSTEM

TECHNICAL FIELD

The present invention relates to an omnidirectional imaging system, and especially relates to an omnidirectional imaging system capable of blind spot supplementation using a plurality of omnidirectional images.

BACKGROUND ART

There is a conventional omnidirectional imaging system that performs full-circumference imaging through the use of two reflections between a plurality of rotator mirrors whose rotation axes coincide with each other (for example, see Patent Literature (PTL) 1). FIG. 29 shows a conventional omnidirectional imaging system described in PTL 1.

In FIG. 29, a primary mirror 301 reflects light incident in directions of horizontal 360 degrees of surroundings. A secondary mirror 302 further reflects the light reflected by the primary mirror 301. The light reflected by the secondary mirror 302 passes through a principal point of a photoreceiving lens system 303, and forms an image on an image plane 304. Note that the primary mirror 301 and the secondary mirror 302 are covered with a transparent tube 305. Thus, the optical system in FIG. 29 can image a subject in directions of horizontal 360 degrees of surroundings, by one photoreceiving lens system.

As another example, there is an omnidirectional imaging system that obtains distance information using a plurality of mirrors (for example, see PTL 2). FIG. 30 shows a conventional omnidirectional imaging system described in PTL 2.

In FIG. 30, an omnidirectional mirror 401 includes a hemispherical mirror 402a and a plurality of spherical mirrors 402b. The hemispherical mirror 402a reflects light incident in directions of horizontal 360 degrees of surroundings, and the plurality of spherical mirrors 402b also reflect light incident in directions of horizontal 360 degrees of surroundings. The light reflected by the hemispherical mirror 402a and the plurality of spherical mirrors 402b is imaged by an imaging device 403. Thus, the optical system in FIG. 30 can capture an image of one subject reflected by the hemispherical mirror and the plurality of spherical mirrors and measure a distance to the subject based on the image.

As another example, there is an omnidirectional imaging system that obtains distance information using a fisheye lens and a rotator mirror (for example, see PTL 3). FIG. 31 shows a conventional omnidirectional imaging system described in PTL 3.

In FIG. 31, a camera 510 includes a fisheye lens a1 and a rotator mirror δ. The camera 510 has a section that directly forms an image in a part of an imaging device 514 through the fisheye lens a1 and a lens optical system 512, and a section that forms an image in a part of the imaging device 514 through the fisheye lens a1 and the lens optical system 512 after reflection by the rotator mirror δ. The omnidirectional imaging system in FIG. 31 obtains distance information to a subject, from the section that directly forms an image through the fisheye lens α1 and the section that forms an image through the fisheye lens α1 after reflection by the rotator mirror δ.

CITATION LIST

Patent Literature

[PTL 1]
Japanese Patent No. 3523783
[PTL 2]
Japanese Unexamined Patent Application Publication No. 2005-234224
[PTL 3]
Japanese Unexamined Patent Application Publication No. 2006-220603

Non Patent Literature

[NPL 1]
ZITNICK, L., KANG, S. B., UYTTENDAELE, M., WINDER, S., AND SZELISKI, R., 2004, "High-quality video view interpolation using a layered representation", In SIGGRAPH Conf. Proc., pp. 600 to 608
[NPL 2]
TONOMURA Motonobu, "Research on fisheye lenses introduced into cars", Design Wave Magazine, September, 2008, pp. 111 to 125

SUMMARY OF INVENTION

Technical Problem

However, the conventional structure in PTL 1 has a problem that there is a blind spot area concealed by the secondary mirror. Particularly in the case where the structure is ceiling-mounted, this blind spot area is situated directly below the structure, which is a very important part of a full-circumference image.

The conventional structure in PTL 2 is capable of positioning, but has a problem that there is a blind spot area of the primary and secondary mirrors caused by the camera because the camera is placed on the subject side of the primary and secondary mirrors. Particularly in the case where the structure is ceiling-mounted, this blind spot area is situated directly below the structure, which is a very important part of a full-circumference image. The structure also has a problem that there is a blind spot area of the primary mirror caused by the secondary mirrors because the secondary mirrors are placed on the subject side of the primary mirror, leading to a narrower imaging range of the primary mirror.

The conventional structure in PTL 3 does not have a blind spot directly below the structure in the case where the structure is ceiling-mounted, but has a problem of a significantly narrowed imaging range of the fisheye lens as an image from a viewpoint other than that of the fisheye lens is obtained through reflection by the rotator mirror.

The present invention is developed to solve the conventional problems, and has an object of providing an omnidirectional imaging system that can obtain an image with no blind spot area while ensuring a wide field of view.

Solution to Problem

An omnidirectional imaging system according to one aspect of the present invention includes: a primary mirror including a hyperbolic mirror; a plurality of secondary mirrors arranged around the primary mirror, each of the plurality of secondary mirrors including a hyperbolic mirror; and a camera that captures an image reflected by the primary mirror and images reflected by the plurality of secondary mirrors, wherein a hyperboloid of the primary mirror and hyperboloids of the plurality of secondary mirrors have a substantially coincident outer focal point, and the camera is placed so that a viewpoint of the camera substantially coincides with the outer focal point of the hyperboloid of the primary mirror and the hyperboloids of the plurality of secondary mirrors, the viewpoint of the camera being an entrance pupil position of a lens attached to the camera.

According to this structure, in the omnidirectional imaging system, the camera can directly capture the images reflected by the primary mirror and the plurality of secondary mirrors. This ensures a wider field of view than, for example, the omnidirectional imaging device using the fisheye lens in the related art. Besides, an image corresponding to a blind spot area caused by the presence of the camera on a central axis of the primary mirror can be obtained from the images reflected by the plurality of secondary mirrors. Hence, the blind spot area can be eliminated.

Note that the present invention can be realized not only as the omnidirectional imaging system, but also as an omnidirectional imaging method including steps corresponding to the characteristic units included in the omnidirectional imaging system. The present invention can also be realized as a program for causing a computer to execute such characteristic steps. The program may be distributed via a recording medium such as a CD-ROM (Compact Disc-Read Only Memory) or a transmission medium such as the Internet.

The present invention can further be realized as a semiconductor integrated circuit (LSI) that partly or wholly implements the functions of the omnidirectional imaging system.

Advantageous Effects of Invention

In the omnidirectional imaging system according to the present invention, the primary mirror including a hyperbolic mirror ensures a wide field of view. In addition, the substantial coincidence between the outer focal point of the hyperboloid of the primary mirror and the outer focal points of the hyperboloids of the plurality of secondary mirrors enables an image with no blind spot area to be obtained.

Thus, the present invention provides an omnidirectional imaging system that can obtain an image with no blind spot area while ensuring a wide field of view. With increasing importance of omnidirectional imaging systems as image obtainment means today, the present invention has an extremely high practical value.

BRIEF DESCRIPTION OF DRAWINGS

FIG. 1(a) is a side view of the optical system structure of the omnidirectional imaging system in Embodiments 1 and 2 of the present invention and FIG. 1(b) is a perspective view of the optical system structure of the omnidirectional imaging system in Embodiments 1 and 2 of the present invention.

FIG. 20(a) is a schematic diagram showing an image captured by the omnidirectional imaging system in Embodiment 5 of the present invention and FIG. 20(b) is a schematic diagram showing an example of a supplementation process performed on an image captured by the omnidirectional imaging system in Embodiment 5 of the present invention.

FIG. 24(a) is a schematic diagram showing an image captured by the omnidirectional imaging system in Embodiment 6 of the present invention and FIG. 24(b) is a schematic diagram showing an example of a supplementation process performed on an image captured by the omnidirectional imaging system in Embodiment 6 of the present invention.

DESCRIPTION OF EMBODIMENTS

Figure 1:
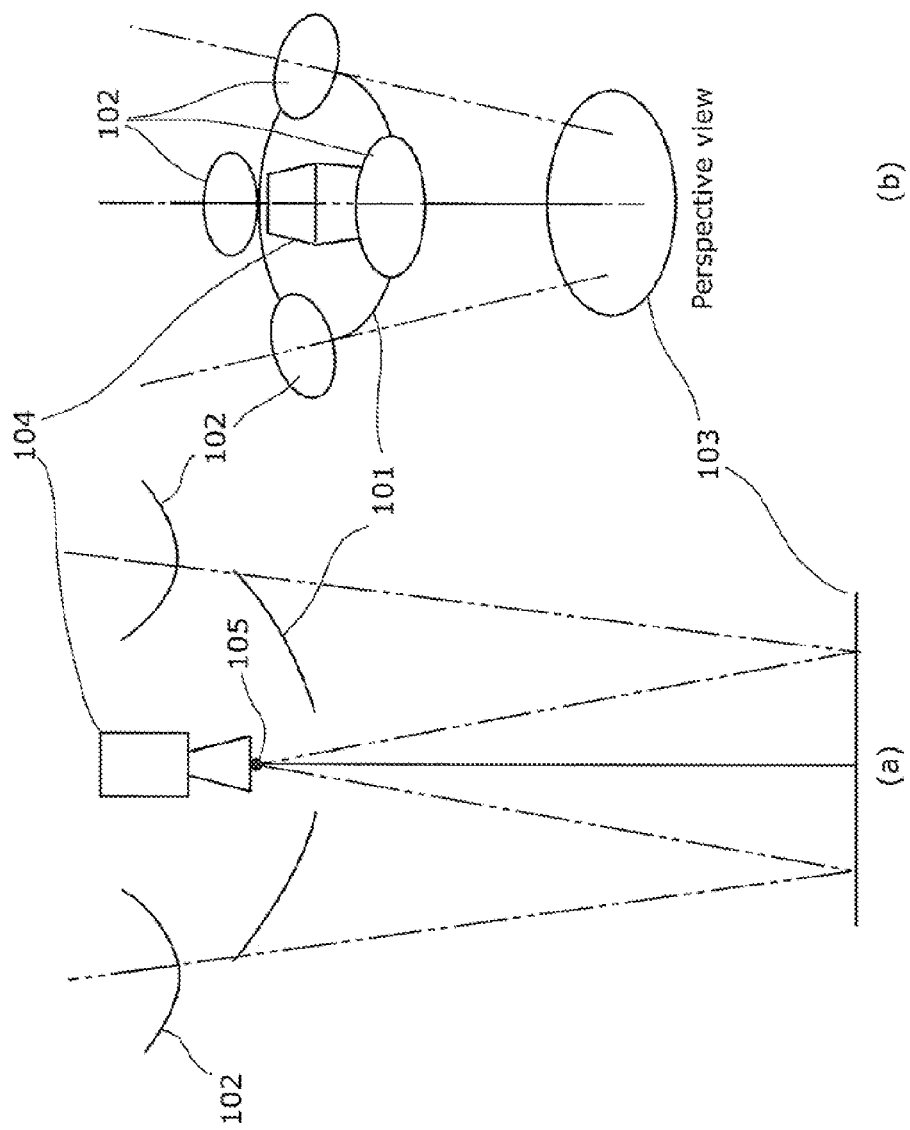
FIG. 1 is a diagram showing an optical system structure of an omnidirectional imaging system in Embodiments 1 and 2 of the present invention, where

An omnidirectional imaging system according to one aspect of the present invention includes: a primary mirror including a hyperbolic mirror; a plurality of secondary mirrors arranged around the primary mirror, each of the plurality of secondary mirrors including a hyperbolic mirror; and a camera that captures an image reflected by the primary mirror and images reflected by the plurality of secondary mirrors, wherein a hyperboloid of the primary mirror and hyperboloids of the plurality of secondary mirrors have a substantially coincident outer focal point, and the camera is placed so that a viewpoint of the camera substantially coincides with the outer focal point of the hyperboloid of the primary mirror and the hyperboloids of the plurality of secondary mirrors, the viewpoint of the camera being an entrance pupil position of a lens attached to the camera.

According to this structure, in the omnidirectional imaging system, the camera can directly capture the images reflected by the primary mirror and the plurality of secondary mirrors. This ensures a wider field of view than, for example, the omnidirectional imaging device using the fisheye lens in the related art. Besides, an image corresponding to a blind spot area caused by the presence of the camera on a central axis of the primary mirror can be obtained from the images reflected by the plurality of secondary mirrors. Hence, the blind spot area can be eliminated.

Moreover, the omnidirectional imaging system may further include a substantially plane mirror in a substantially plane shape, the substantially plane mirror being placed between the outer focal point of the hyperboloid of the primary mirror and the hyperboloids of the plurality of secondary mirrors and an inner focal point of the hyperboloid of the primary mirror and the hyperboloids of the plurality of secondary mirrors, wherein the camera is placed so that the viewpoint of the camera is at a position symmetrical to the outer focal point of the hyperboloid of the primary mirror and the hyperboloids of the plurality of secondary mirrors about the substantially plane mirror, and external light is reflected by the primary mirror or the plurality of secondary mirrors and further reflected by the substantially plane mirror, and as a result enters the camera.

According to this structure, the omnidirectional imaging system can be reduced in size.

Moreover, suppose a hyperbolic equation representing a shape of the hyperboloid of the primary mirror is the following.

$$\frac{(z-c_m)^2}{a_m^2} - \frac{x^2+y^2}{b_m^2} = 1 \qquad \text{[Math. 1]}$$
$$c_m^2 = a_m^2 + b_m^2$$

where $a_m$, $b_m$, and $c_m$ are hyperbolic coefficients. Also suppose a point, from among points on an outside diameter of the primary mirror, at which the outside diameter is maximum, is the following.

$$P_{r_m} = (r_m, z_m)(r_m > 0) \qquad \text{[Math. 2]}$$

where a central axis of the primary mirror and a central axis of a first secondary mirror that is one of the plurality of secondary mirrors are included in an X-Z plane in which the central axis of the primary mirror is set as a Z axis and the outer focal point of the hyperboloid of the primary mirror and the hyperboloid of the first secondary mirror is set as an origin. Then, the first secondary mirror may be placed so that a vertex position $T(x_T, z_T)$ of the first secondary mirror satisfies the following.

$$z_T \geq \frac{1}{r_m}\left(\frac{a_m}{b_m}\sqrt{b_m^2+r_m^2} - c_m\right)x_T + 2c_m. \qquad \text{[Math. 3]}$$

According to this structure, the placement of the secondary mirror is limited to such a position where the secondary mirror is not seen in the primary mirror. As a result, a wider effective field of view of the primary mirror can be ensured.

Moreover, suppose a hyperbolic equation representing a shape of the hyperboloid of the primary mirror is the following.

$$\frac{(z-c_m)^2}{a_m^2} - \frac{x^2+y^2}{b_m^2} = 1 \qquad \text{[Math. 4]}$$
$$c_m^2 = a_m^2 + b_m^2$$

where $a_m$, $b_m$, and $c_m$ are hyperbolic coefficients. Also suppose a point, from among points on an outside diameter of the primary mirror, at which the outside diameter is maximum, is the following.

$$P_{r_m} = (r_m, z_m)(r_m > 0) \qquad \text{[Math. 5]}$$

where a central axis of the primary mirror and a central axis of a second secondary mirror that is one of the plurality of secondary mirrors are included in an X-Z plane in which the central axis of the primary mirror is set as a Z axis and the outer focal point of the hyperboloid of the primary mirror and the hyperboloid of the second secondary mirror is set as an origin. Then, the second secondary mirror may be placed so that a vertex position $T(x_T, z_T)$ of the second secondary mirror satisfies the following.

$$z_T \le \frac{1}{\tan\theta_1} x_T \quad \text{[Math. 6]}$$

where θ is an angle formed by the central axis of the primary mirror and the central axis of the second secondary mirror, and $\theta_1$ is θ when the point at which the outside diameter is maximum is present on the central axis of the second secondary mirror.

According to this structure, the placement of the secondary mirror is limited to such a position where a part of a blind spot area in the image reflected by the primary mirror is reliably seen in the secondary mirror. As a result, the blind spot area of the primary mirror can be reliably supplemented by the secondary mirror.

Moreover, the omnidirectional imaging system may further include a blind spot supplementation unit that generates a supplemental synthetic image using the images reflected by the plurality of secondary mirrors, the supplemental synthetic image being an image for supplementing a blind spot area in the image reflected by the primary mirror.

According to this structure, the omnidirectional imaging system can generate the supplemental synthetic image for supplementing the blind spot area in the image reflected by the primary mirror, by synthesizing the plurality of images reflected by the plurality of secondary mirrors.

Moreover, the blind spot supplementation unit may generate an arbitrary viewpoint image using the images reflected by the plurality of secondary mirrors, and generate the supplemental synthetic image using the arbitrary viewpoint image, the arbitrary viewpoint image having a viewpoint at an inner focal point of the primary mirror.

Moreover, the omnidirectional imaging system may further include a positioning unit that computes a corresponding point for a designation point by image matching, and positions a subject from coordinates of the designation point and coordinates of the corresponding point, the designation point being a point that is designated in the image reflected by the primary mirror and corresponds to the subject, and the corresponding point being a point as that is in an image reflected by one of the plurality of secondary mirrors and corresponds to the subject.

According to this structure, the positioning unit in the omnidirectional imaging system can compute the point on the primary mirror and the point on the secondary mirror at which light from one designated subject is incident. The positioning unit can therefore determine the position of the subject in a three-dimensional space by triangulation.

Moreover, the omnidirectional imaging system may further include a positioning unit that computes a corresponding point for a designation point by image matching, and positions a subject from coordinates of the designation point and coordinates of the corresponding point, the designation point being a point that is designated in an image reflected by one of the plurality of secondary mirrors and corresponds to the subject, and the corresponding point being a point that is in the image reflected by the primary mirror and corresponds to the subject.

Moreover, the omnidirectional imaging system may further include a positioning unit that computes a corresponding point for a designation point by image matching, and positions a subject from coordinates of the designation point and coordinates of the corresponding point, the designation point being a point that is designated in an image reflected by one of the plurality of secondary mirrors and corresponds to the subject, and the corresponding point being a point that is in an image reflected by one of the plurality of secondary mirrors other than the secondary mirror and corresponds to the subject.

Moreover, the omnidirectional imaging system may further include a blind spot supplementation unit that generates a supplemental synthetic image using an image reflected by at least one part of the plurality of secondary mirrors, the supplemental synthetic image being an image for supplementing a blind spot area in the image reflected by the primary mirror.

Moreover, the blind spot supplementation unit may generate an arbitrary viewpoint image using an image reflected by at least one part of the plurality of secondary mirrors, to generate the supplemental synthetic image for supplementing the blind spot area, the arbitrary viewpoint image having a viewpoint at an inner focal point of the primary mirror.

Moreover, the blind spot supplementation unit may record a correspondence relationship between images reflected by secondary mirrors out of the plurality of secondary mirrors and used when generating the supplemental synthetic image and areas in the supplemental synthetic image, wherein the positioning unit computes a first point and a second point by image matching, and positions, from the first point and the second point, a subject corresponding to a designation point designated in the supplemental synthetic image, the first point being a point that is in an image reflected by a first secondary mirror out of the plurality of secondary mirrors and corresponds to the subject, the second point being a point that is in an image reflected by one of the plurality of secondary mirrors other than the first secondary mirror and corresponds to the subject, and the first secondary mirror corresponding to an area, in the supplemental synthetic image, that includes the designation point.

An omnidirectional imaging system according to another aspect of the present invention includes: a plurality of hyperbolic mirrors; and a camera that captures images reflected by the plurality of hyperbolic mirrors, wherein a central axis of each of the plurality of hyperbolic mirrors is inclined so that the plurality of hyperbolic mirrors have a substantially coincident outer focal point, and the camera is placed so that a viewpoint of the camera substantially coincides with the outer focal point of the plurality of hyperbolic mirrors, the viewpoint of the camera being an entrance pupil position of a lens attached to the camera.

According to this structure, the omnidirectional imaging system can generate, from overlapping parts of the images reflected by the plurality of secondary mirrors, an image with no blind spot area while ensuring a wide field of view, with there being no need for a primary mirror.

Moreover, the omnidirectional imaging system may further include a substantially plane mirror in a substantially plane shape, the substantially plane mirror being placed between the outer focal point of the plurality of hyperbolic mirrors substantially coinciding with the viewpoint of the camera and an inner focal point of the plurality of hyperbolic mirrors, wherein the camera is placed so that the viewpoint of the camera is at a position symmetrical to the outer focal point of the plurality of hyperbolic mirrors about the substantially plane mirror, and external light is reflected by each of the plurality of hyperbolic mirrors and further reflected by the substantially plane mirror, and as a result enters the camera.

Moreover, the omnidirectional imaging system may further include a blind spot supplementation unit that generates a supplemental synthetic image by synthesizing an image reflected by at least one part of the plurality of hyperbolic mirrors, the supplemental synthetic image being an image with no blind spot area.

Moreover, the blind spot supplementation unit may generate the supplemental synthetic image, by supplementing a blind spot area in an image reflected by one of the plurality of hyperbolic mirrors using an image reflected by at least one part of the plurality of hyperbolic mirrors other than the hyperbolic mirror.

Moreover, the blind spot supplementation unit may generate an arbitrary viewpoint image using an image reflected by at least one part of the plurality of hyperbolic mirrors, and generate the supplemental synthetic image using the arbitrary viewpoint image, the arbitrary viewpoint image having a viewpoint at a single viewpoint position of a hyperbolic mirror that is subjected to supplementation among the plurality of hyperbolic mirrors.

Moreover, the omnidirectional imaging system may further include a positioning unit that computes a corresponding point for a designation point by image matching, and positions a subject from coordinates of the designation point and coordinates of the corresponding point, the designation point being a point that is designated in an image reflected by one of the plurality of hyperbolic mirrors and corresponds to the subject, and the corresponding point being a point that is in an image reflected by one of the plurality of hyperbolic mirrors other than the hyperbolic mirror and corresponds to the subject.

Moreover, the omnidirectional imaging system may further include a blind spot supplementation unit that generates a supplemental synthetic image by synthesizing an image reflected by at least one part of the plurality of hyperbolic mirrors, the supplemental synthetic image being an image with no blind spot area.

Moreover, the blind spot supplementation unit may generate an arbitrary viewpoint image using an image reflected by at least one part of the plurality of hyperbolic mirrors, and generate the supplemental synthetic image using the arbitrary viewpoint image, the arbitrary viewpoint image having a viewpoint of an omnidirectional image.

Moreover, the blind spot supplementation unit may record a correspondence relationship between images reflected by hyperbolic mirrors out of the plurality of hyperbolic mirrors and used when generating the supplemental synthetic image and areas in the supplemental synthetic image, wherein the positioning unit computes a first point and a second point by image matching, and positions, from the first point and the second point, a subject corresponding to a designation point designated in the supplemental synthetic image, the first point being a point that is in an image reflected by a first hyperbolic mirror out of the plurality of hyperbolic mirrors and corresponds to the subject, the second point being a point that is in an image reflected by one of the plurality of hyperbolic mirrors other than the first hyperbolic mirror and corresponds to the subject, and the first hyperbolic mirror corresponding to an area, in the supplemental synthetic image, that includes the designation point.

Moreover, the blind spot supplementation unit may supplement a blind spot area in an image reflected by one of the plurality of hyperbolic mirrors, using an image reflected by at least one part of the plurality of hyperbolic mirrors other than the hyperbolic mirror.

Moreover, the blind spot supplementation unit may generate an arbitrary viewpoint image using an image reflected by at least one part of the plurality of hyperbolic mirrors, and generate the supplemental synthetic image using the arbitrary viewpoint image, the arbitrary viewpoint image having a viewpoint at a single viewpoint position of the hyperbolic mirror that is subjected to the supplementation among the plurality of hyperbolic mirrors.

Moreover, the blind spot supplementation unit may record a correspondence relationship between images reflected by hyperbolic mirrors out of the plurality of hyperbolic mirrors and used when generating the supplemental synthetic image and areas in the supplemental synthetic image, wherein the positioning unit computes a first point and a second point by image matching, and positions, from the first point and the second point, a subject corresponding to a designation point designated in the supplemental synthetic image, the first point being a point that is in an image reflected by a first hyperbolic mirror out of the plurality of hyperbolic mirrors and corresponds to the subject, the second point being a point that is in an image reflected by one of the plurality of hyperbolic mirrors other than the first hyperbolic mirror and corresponds to the subject, and the first hyperbolic mirror corresponding to an area, in the supplemental synthetic image, that includes the designation point.

An omnidirectional imaging system according to another aspect of the present invention includes: a plurality of omnidirectional imaging devices that each capture an omnidirectional image; and a blind spot supplementation unit that generates a supplemental synthetic image by synthesizing an image captured by at least one part of the plurality of omnidirectional imaging devices, the supplemental synthetic image being an image with no blind spot area.

According to this structure, the omnidirectional imaging system can generate an image with no blind spot area while ensuring a wide field of view, irrespective of the optical system structure.

Moreover, the omnidirectional imaging system may further include a positioning unit that computes a corresponding point for a designation point by image matching, and positions a subject from coordinates of the designation point and coordinates of the corresponding point, the designation point being a point that is designated in an image captured by one of the plurality of omnidirectional imaging devices and corresponds to the subject, and the corresponding point being a point that is in an image captured by one of the plurality of omnidirectional imaging devices other than the omnidirectional imaging device and corresponds to the subject.

Moreover, the blind spot supplementation unit may record a correspondence relationship between images captured by omnidirectional imaging devices out of the plurality of omnidirectional imaging devices and used when generating the supplemental synthetic image and areas in the supplemental synthetic image, wherein the positioning unit computes a first point and a second point by image matching, and positions, from the first point and the second point, a subject corresponding to a designation point designated in the supplemental synthetic image, the first point being a point that is in an image captured by a first omnidirectional imaging device out of the plurality of omnidirectional imaging devices and corresponds to the subject, the second point being a point that is in an image captured by one of the plurality of omnidirectional imaging devices other than the first omnidirectional imaging device and corresponds to the subject, and the first omnidirectional imaging device corresponding to an area, in the supplemental synthetic image, that includes the designation point.

The following describes embodiments of the present invention in more detail, with reference to drawings.

The embodiments described below each represent a preferred embodiment of the present invention. The numerals, shapes, components, component placement positions, connections, and the like described in the embodiments are merely examples, and should not limit the scope of the present invention. The scope of the present invention is limited only by the claims. Accordingly, the components that are included in the embodiments but are not defined in the independent claims representing the broadest concepts of the present invention are described as not being necessarily required for achieving the object of the present invention but constituting more preferred embodiments.

Embodiment 1

FIG. 1 is a diagram showing an optical system structure of an omnidirectional imaging system in Embodiment 1 of the present invention. In detail, FIG. 1(a) is a side view of the omnidirectional imaging system, and FIG. 1(b) is a perspective view of the omnidirectional imaging system.

In FIG. 1, a camera 104 captures an image viewed from a viewpoint 105. A hyperbolic primary mirror 101 reflects light from a subject. The light reflected by the primary mirror 101 is reflected by a substantially plane mirror 103, and imaged by the camera 104 as image information. An area directly below the camera 104, however, is a blind spot area because the camera 104 itself is seen in the substantially plane mirror 103.

Figure 2:
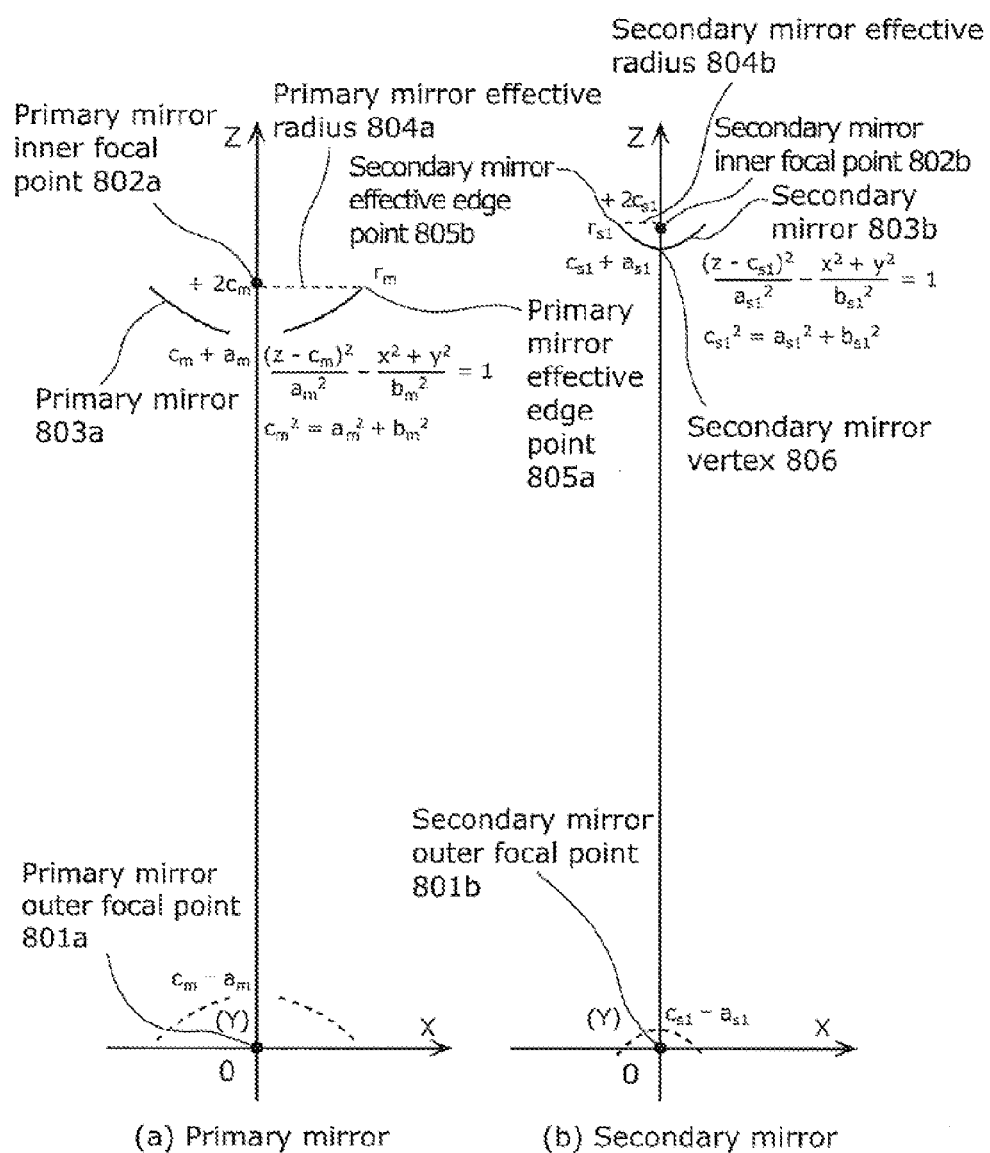
FIG. 2 is a diagram showing focal positions of a primary mirror and a secondary mirror in Embodiments 1 and 2 of the present invention.

A hyperbolic secondary mirror 102 reflects light from the subject. A plurality of secondary mirrors 102 are arranged so as to surround the primary mirror 101, in accordance with the below-mentioned placement conditions. The light reflected by the secondary mirror 102 is reflected by the substantially plane mirror 103, and imaged by the camera 104. FIG. 2 is a diagram showing focal positions of the primary mirror and the secondary mirror in Embodiment 1 of the present invention. Note that the reflection by the substantially plane mirror is not shown in FIG. 2. In detail, FIG. 2(a) is a diagram showing the focal position of the primary mirror, where an outer focal point 801a of a primary mirror 803a is set as the origin and a central axis of the primary mirror 803a is set as the Z axis. In this case, the shape of the primary mirror is represented by the following expression.

$$\frac{(z-c_m)^2}{a_m^2} - \frac{x^2+y^2}{b_m^2} = 1 \qquad [\text{Math. 7}]$$
$$c_m^2 = a_m^2 + b_m^2$$

where coordinates of an inner focal point 802a of the primary mirror 803a are (0, 0, $2c_m$). Here, $a_m$, $b_m$, and $c_m$ are coefficients of the hyperboloid of the primary mirror.

Let $r_m$ be a maximum radius of the primary mirror effective for image obtainment, which is referred to as a primary mirror effective radius 804a. In addition, a set of points having the same radius as the primary mirror effective radius 804a on the primary mirror is referred to as a primary mirror effective edge (circular). When coordinates of a point 805a on the primary mirror effective edge where X>0, which is an intersection point of the primary mirror effective edge and the X-Z plane, are expressed as ($r_m$, 0, $z_m$), the following holds.

$$z_m = \frac{a_m}{b_m}\sqrt{b_m^2 + r_m^2} + c_m. \qquad [\text{Math. 8}]$$

FIG. 2(b) is a diagram showing the focal position of the secondary mirror, where an outer focal point 801b of a secondary mirror 803b is set as the origin and a central axis of the secondary mirror 803b is set as the Z axis. In this case, the shape of the secondary mirror is represented by the following expression.

$$\frac{(z-c_{s1})^2}{a_{s1}^2} - \frac{x^2+y^2}{b_{s1}^2} = 1 \qquad [\text{Math. 9}]$$
$$c_{s1}^2 = a_{s1}^2 + b_{s1}^2$$

where coordinates of an inner focal point 802b of the secondary mirror 803b are (0, 0, $2c_{s1}$), and coordinates of a secondary mirror vertex 806 is (0, 0, $c_{s1}+a_{s1}$). Here, $a_{s1}$, $b_{s1}$, and $c_{s1}$ are coefficients of the hyperboloid of the secondary mirror.

Let $r_{s1}$ be a maximum radius of the secondary mirror effective for image obtainment, which is referred to as a secondary mirror effective radius 804b. In addition, a set of points having the same radius as the secondary mirror effective radius 804b on the secondary mirror is referred to as a secondary mirror effective edge (circular). When coordinates of a point 805b on the secondary mirror effective edge where X<0, which is an intersection point of the secondary mirror effective edge and the X-Z plane, are expressed as ($-r_{s1}$, 0, $z_{s1}$), the following holds.

$$z_{s1} = \frac{a_{s1}}{b_{s1}}\sqrt{b_{s1}^2 + r_{s1}^2} + c_{s1} \qquad [\text{Math. 10}]$$

Figure 3:
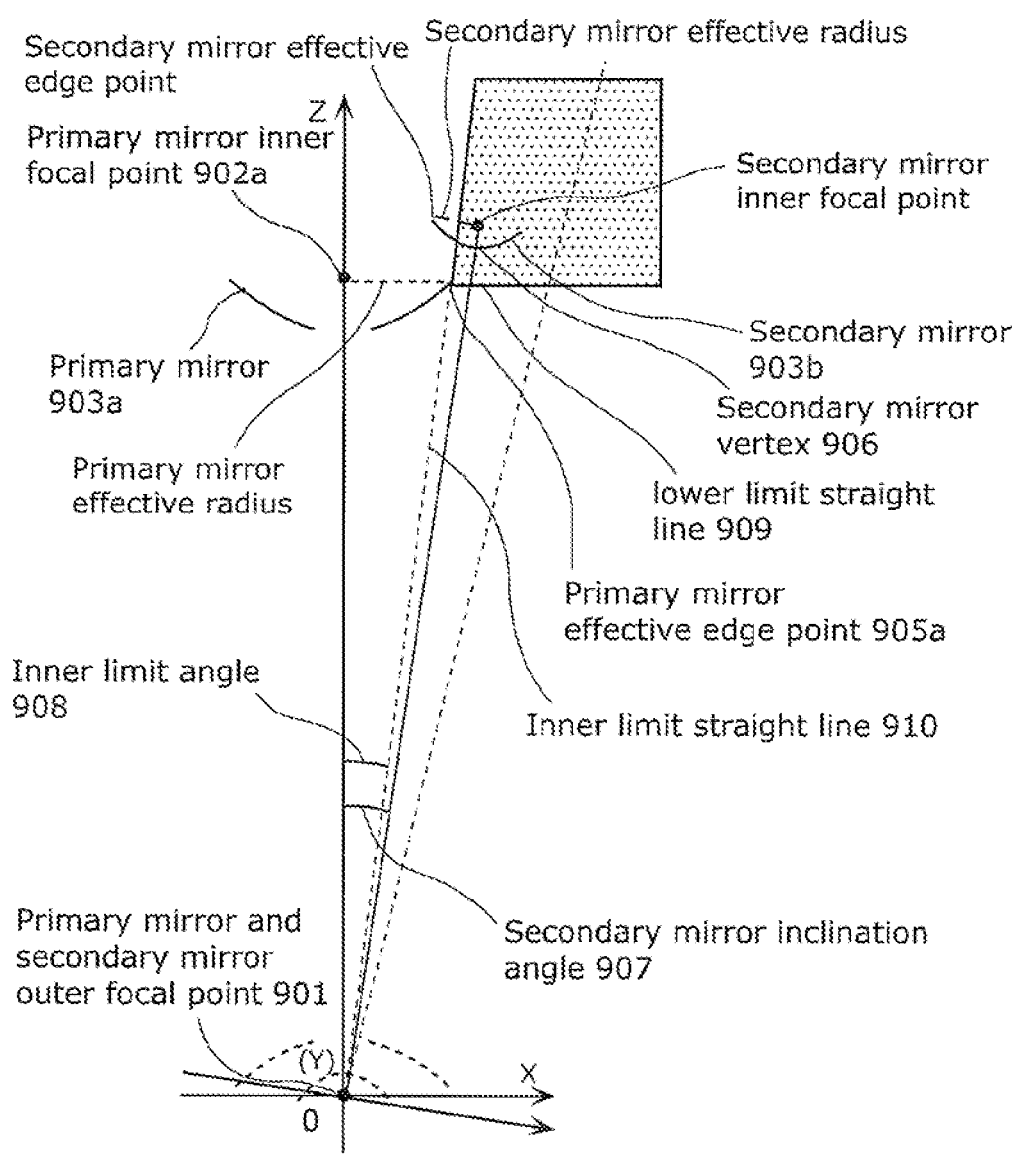
FIG. 3 is a diagram showing a positional relationship between a primary mirror and one of a plurality of secondary mirrors in Embodiments 1 and 2 of the present invention.

FIG. 3 is a diagram showing a positional relationship between the primary mirror and one of the plurality of secondary mirrors in Embodiment 1 of the present invention, using a coordinate system in which a plane including the focal points of the primary mirror and the secondary mirror is the X-Z plane. Note that the reflection by the substantially plane mirror is not shown in FIG. 3. A hyperbolic mirror is known to have a single viewpoint property that light incident from a subject toward an inner focal point of the hyperbolic mirror is reflected toward an outer focal point of the hyperbolic mirror. In combined use of the primary mirror and the secondary mirror, by making the outer focal point of the primary mirror and the outer focal point of the secondary mirror to coincide with each other and placing the viewpoint of the camera at this position, the primary mirror and the secondary mirror can both maintain the single viewpoint property.

In FIG. 3, a primary mirror and secondary mirror outer focal point 901 is a common outer focal point of a primary mirror 903a and a secondary mirror 903b, which is set as the origin of the X-Z plane. A central axis of the primary mirror 903a is set as the Z axis, while a central axis of the secondary mirror 903b is inclined from the Z axis by a secondary mirror inclination angle 907.

An inner limit straight line 910 is a straight line connecting the primary mirror and secondary mirror outer focal point 901 and a primary mirror effective edge point 905a. Let $\theta_1$ be an inner limit angle 908 formed by the inner limit straight line 910 and the central axis of the primary mirror (Z axis), and ($x_T$, 0, $z_T$) be coordinates of a secondary mirror vertex 906 (806 in FIG. 2(b)).

When $$z_T \le \frac{1}{\tan(\theta_1)} x_T \qquad [\text{Math. 11}]$$

is satisfied, the secondary mirror vertex 906 is situated outside the inner limit straight line 910. Accordingly, light from a subject located below is reflected by the secondary mirror 903b, and is incident at the primary mirror and secondary mirror outer focal point 901 and forms an image. This allows a part of a blind spot area of a primary mirror image to be supplemented by a secondary mirror image.

A lower limit straight line 909 is a straight line connecting a primary mirror inner focal point 902a and the primary mirror effective edge point 905a.

When the secondary mirror vertex 906 satisfies $$z_T \geq \frac{1}{r_m}\left(\frac{a_m}{b_m}\sqrt{b_m^2 + r_m^2} - c_m\right)x_T + 2c_m \qquad [\text{Math. 12}]$$

with respect to the lower limit straight line 909, the secondary mirror vertex 906 is situated above the lower limit straight line 909. This keeps the secondary mirror from obstructing the effective field of view of the primary mirror.

By setting the secondary mirror vertex 906 in a gray area (shaded area) in FIG. 3 in accordance with these two conditions, the secondary mirror can be placed without reducing the effective field of view of the primary mirror. Moreover, a part of the blind spot area image of the primary mirror can be captured by the secondary mirror. Arranging the plurality of secondary mirrors in this way makes it possible to capture the whole blind spot area image of the primary mirror.

Figure 4:
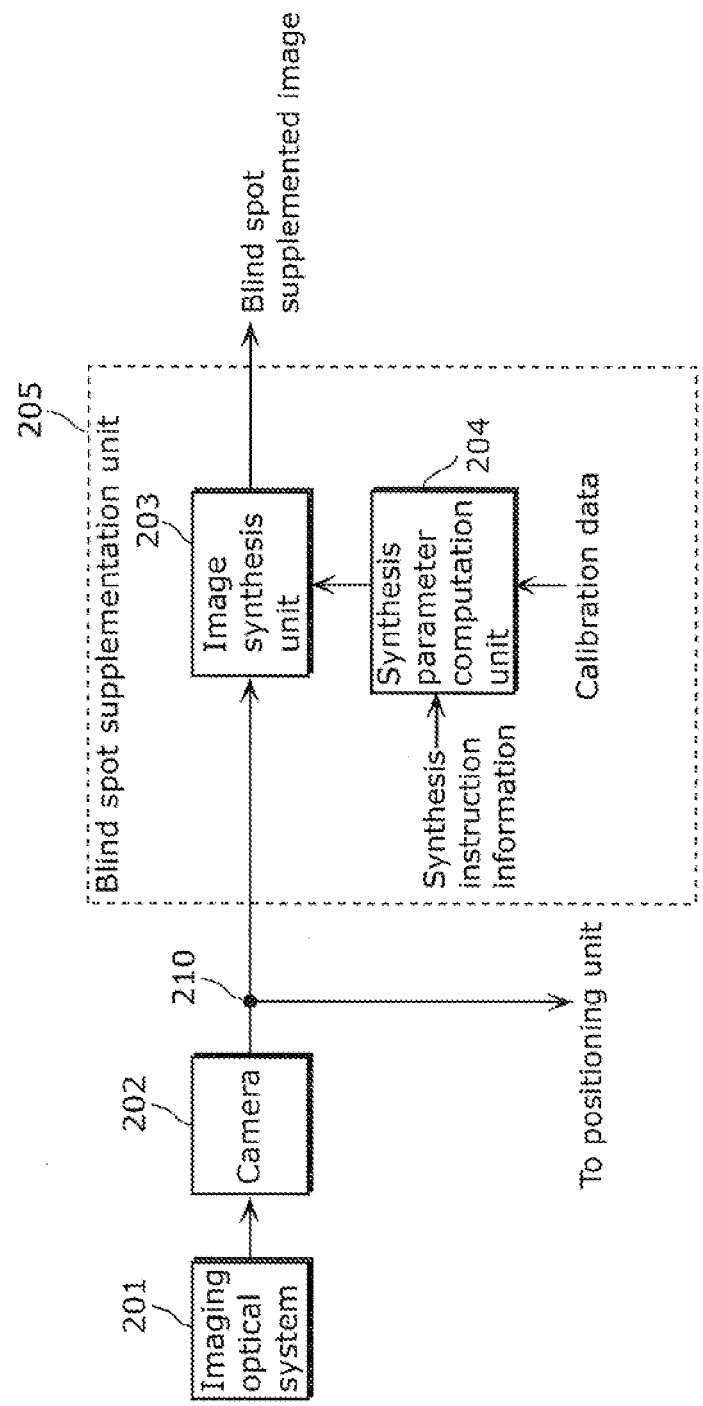
FIG. 4 is a diagram showing an image processing structure of a blind spot supplementation unit in Embodiment 1 of the present invention.

FIG. 4 is a diagram showing an image processing structure of a blind spot supplementation unit in Embodiment 1 of the present invention.

In FIG. 4, an imaging optical system 201 is the imaging optical system shown in FIG. 1. A camera 202 (corresponding to the camera 104 in FIG. 1) images a subject. An omnidirectional image 210 obtained as a result is inputted to a blind spot supplementation unit 205. The blind spot supplementation unit 205 includes an image synthesis unit 203 and a synthesis parameter computation unit 204, and receives the omnidirectional image 210 as an input and outputs a blind spot supplemented image. In more detail, the image synthesis unit 203 generates a supplemental synthetic image which is an image corresponding to a blind spot area and is used for supplementing the blind spot area. The image synthesis unit 203 then performs the below-mentioned supplementation process on a blind spot area of the omnidirectional image 210 inputted to the blind spot supplementation unit 205, by synthesizing the omnidirectional image 210 and the supplemental synthetic image adjusted in position and size so as to overlay the supplemental synthetic image. The image synthesis unit 203 thus generates and outputs the blind-spot-supplemented omnidirectional image, as a blind spot supplemented image. The process whereby the blind spot supplementation unit 205 generates the supplemental synthetic image and then synthesizes the supplemental synthetic image and the image having the blind spot area is hereafter referred to as "blind spot supplemented image generation" for simplicity's sake.

The synthesis parameter computation unit 204 computes a synthesis parameter for performing the supplementation process, from calibration data indicating the structure and property of the optical system and synthesis instruction information designating a condition that requires adjustment (e.g. a height, a distance from the camera, a camera viewpoint position, and the like that require adjustment). The image synthesis unit 203 performs the supplementation synthesis process on the blind spot area according to the synthesis parameter computed by the synthesis parameter computation unit 204, and outputs the resulting image as the blind spot supplemented image.

For instance, the synthesis parameter is a combination of a coordinate value of a primary mirror area and a coordinate value of a secondary mirror area corresponding to the point. As an example, the image synthesis unit 203 specifies, in an image (also referred to as a primary mirror image) generated by the camera 202 imaging light reflected by the primary mirror, a primary mirror image partial area by a plurality of coordinate values included in the synthesis parameter. This primary mirror image partial area is a part of a blind spot area. The image synthesis unit 203 also specifies, in an image (also referred to as a secondary mirror image) generated by the camera 202 imaging light reflected by the secondary mirror, a secondary mirror image partial area corresponding to the primary mirror image partial area, by the plurality of coordinate values included in the synthesis parameter. The image synthesis unit 203 enlarges, reduces, or rotates the secondary mirror image partial area so that the primary mirror image partial area and the corresponding secondary mirror image partial area included in the synthesis parameter coincide with each other. The image synthesis unit 203 then performs image processing of overlaying the secondary mirror image partial area on the corresponding primary mirror image partial area.

Here, the synthesis parameter may include only a combination of representative points. In this case, the supplementation process may be performed by computing the inside of a polygon formed by the representative points by linear interpolation in the image synthesis unit 203 or the synthesis parameter computation unit 204.

Note that the omnidirectional imaging system in this embodiment may include a positioning unit 1208 described in detail in Embodiment 2, in addition to the blind spot supplementation unit 205. Though the omnidirectional imaging system in this embodiment can generate the blind spot supplemented image without the positioning unit 1208, the inclusion of the positioning unit 1208 enables subject positioning to be performed in parallel with blind spot supplemented image generation.

Figure 5:
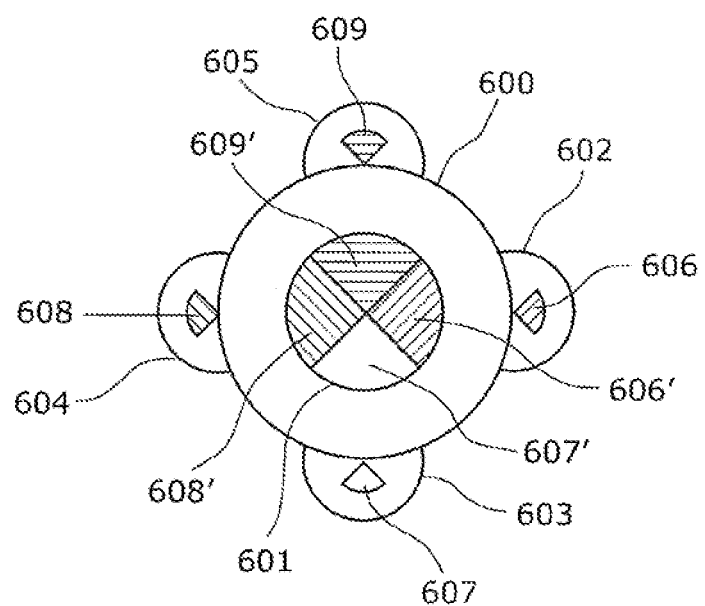
FIG. 5 is a first schematic diagram showing an example of a supplementation process performed on an image captured by the omnidirectional imaging system in Embodiment 1 of the present invention.
Figure 6:
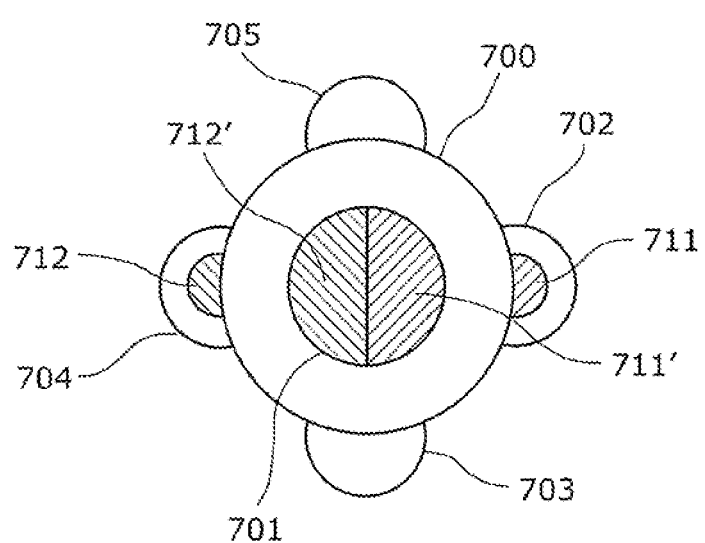
FIG. 6 is a second schematic diagram showing an example of a supplementation process performed on an image captured by the omnidirectional imaging system in Embodiment 1 of the present invention.

FIGS. 5 and 6 are each a schematic diagram showing an example of a supplementation process performed on an image captured by the omnidirectional imaging system shown in FIG. 1.

In FIG. 5, the blind spot supplementation unit 205 clips a part of each of secondary mirror image areas 602 to 605 and pastes the clipped part in a blind spot area 601 of a primary mirror image area 600, thereby supplementing an image of the blind spot area 601. In detail, the blind spot supplementation unit 205 associates a partial image area 606 of the secondary mirror image area 602 with a corresponding part 606' of the blind spot area 601. The blind spot supplementation unit 205 also associates a partial image area 607 of the secondary mirror image area 603 with a corresponding part 607' of the blind spot area 601. The blind spot supplementation unit 205 also associates a partial image area 608 of the secondary mirror image area 604 with a corresponding part 608' of the blind spot area 601. The blind spot supplementation unit 205 also associates a partial image area 609 of the secondary mirror image area 605 with a corresponding part 609' of the blind spot area 601. By such association, the blind spot supplementation unit 205 supplements the blind spot area 601.

In the example of the supplementation process shown in FIG. 6, the blind spot supplementation unit 205 clips, from among secondary mirror image areas 702 to 705, a part of each of the secondary mirror image areas 702 and 704 and pastes the clipped part in a blind spot area 701 of a primary mirror image area 700, thereby supplementing an image of the blind spot area 701. In detail, the blind spot supplementation unit 205 associates a partial image area 711 of the secondary mirror image area 702 with a corresponding part 711' of the blind spot area 701. The blind spot supplementation unit 205 also associates a partial image area 712 of the secondary mirror image area 704 with a corresponding part 712' of the blind spot area 701. By such association, the blind spot supplementation unit 205 supplements the blind spot area 701.

Though the examples of pasting the areas of about ¼ and about ½ are respectively shown in the schematic diagrams of the supplementation process in FIGS. 5 and 6 in this embodiment, the supplementation process is not limited to such. Various combinations are possible, such as dividing the area in the example shown in FIG. 6 into lower and upper halves and synthesizing the lower and upper halves from the secondary mirror image areas 703 and 705.

Though the above describes the case where the output image is an omnidirectional image, the output image may be in a different form such as a partially clipped image.

Moreover, a supplementation method using an arbitrary viewpoint image may be employed in blind spot supplemented synthetic image generation. Since a stereo can be formed by a pair of two secondary mirrors out of the plurality of secondary mirrors, positioning is possible. For example, an arbitrary viewpoint image can be generated by selecting, from an omnidirectional image of a straight line path, the same ray of light as the one necessary for an image from a new viewpoint. In more detail, a technique of generating an intermediate arbitrary viewpoint image by segmentation-based stereo processing is described in Non Patent Literature (NPL) 1. According to this technique, an arbitrary viewpoint image can be generated from images captured from a plurality of viewpoints (inner focal points of the plurality of secondary mirrors). This enables supplementation from an arbitrary viewpoint, with it being possible to synthesize the image of the blind spot with the viewpoint being set at the inner focal point of the primary mirror in this embodiment.

Embodiment 2

Figure 7:
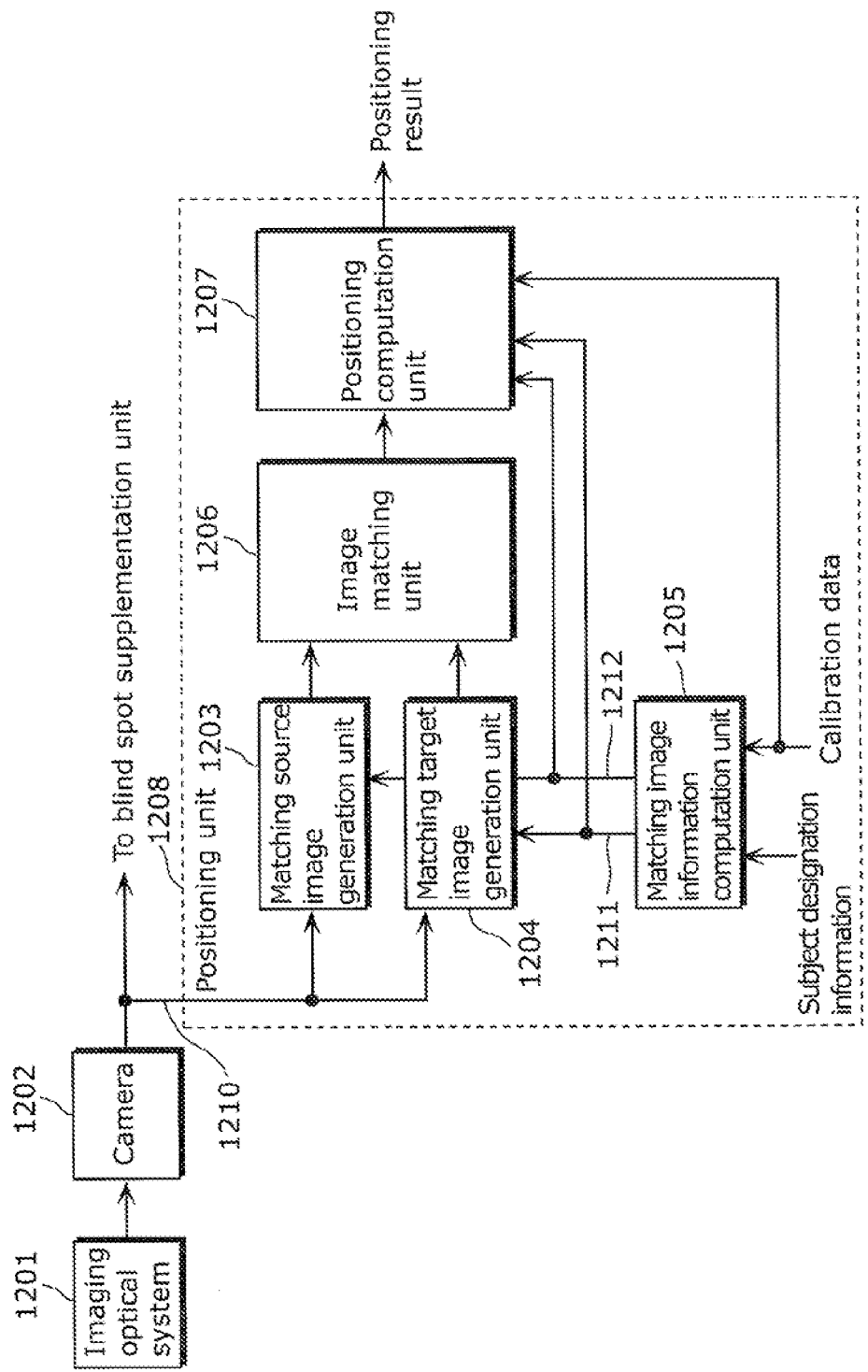
FIG. 7 is a diagram showing an image processing structure of a positioning unit in Embodiment 2 of the present invention.

FIG. 7 is a diagram showing an image processing structure of the positioning unit 1208 in Embodiment 2 of the present invention.

The positioning unit 1208 positions a subject imaged by an imaging optical system 1201.

In FIG. 7, the imaging optical system 1201 is the imaging optical system shown in FIG. 1. A camera 1202 performs imaging, and outputs an omnidirectional image 1210.

A matching source image generation unit 1203 and a matching target image generation unit 1204 generate images used for image matching from the omnidirectional image 1210, according to matching image information (i.e. matching source image information 1212 and matching target image information 1211). The images used for image matching generated by the matching source image generation unit 1203 and the matching target image generation unit 1204 are respectively referred to as a matching source image and a matching target image. A matching image information computation unit 1205 generates the matching image information by the below-mentioned matching image information computation method, according to supplied subject designation information and calibration data.

An image matching unit 1206 searches the matching target image for an area that has a highest degree of coincidence with the matching source image, and outputs coordinates for specifying the area in the matching target image.

A positioning computation unit 1207 performs inverse transformation on coordinates in the matching target image outputted from the image matching unit 1206, with reference to the matching target image information 1211 outputted from the matching image information computation unit 1205. By this inverse transformation, the positioning computation unit 1207 computes corresponding point coordinates which are coordinates of a point in the omnidirectional image 1210 corresponding to a point in the matching target image.

Likewise, the positioning computation unit 1207 performs inverse transformation on coordinates in the matching source image outputted from the image matching unit 1206, with reference to the matching source image information 1212 outputted from the matching image information computation unit 1205. By this inverse transformation, the positioning computation unit 1207 computes matching source coordinates which are coordinates of a point in the omnidirectional image 1210 corresponding to a point in the matching source image. From these two coordinate values (the matching source coordinates and the corresponding point coordinates), the positioning computation unit 1207 computes two vectors directed to the subject by performing reflection calculation for the substantially plane mirror, the primary mirror, and the secondary mirror by the below-mentioned positioning computation method, according to the calibration data. The positioning computation unit 1207 specifies a three-dimensional position of the subject from the two vectors based on the principle of triangulation, and outputs the specified three-dimensional position as a positioning result. The positioning computation unit 1207 will be described in detail later.

Note that the omnidirectional imaging system in this embodiment may include the blind spot supplementation unit 205 in Embodiment 1, in addition to the positioning unit 1208. Though the omnidirectional imaging system in this embodiment can position the subject without the blind spot supplementation unit 205, the inclusion of the blind spot supplementation unit 205 enables blind spot supplemented image generation to be performed in parallel with subject positioning.

Figure 8:
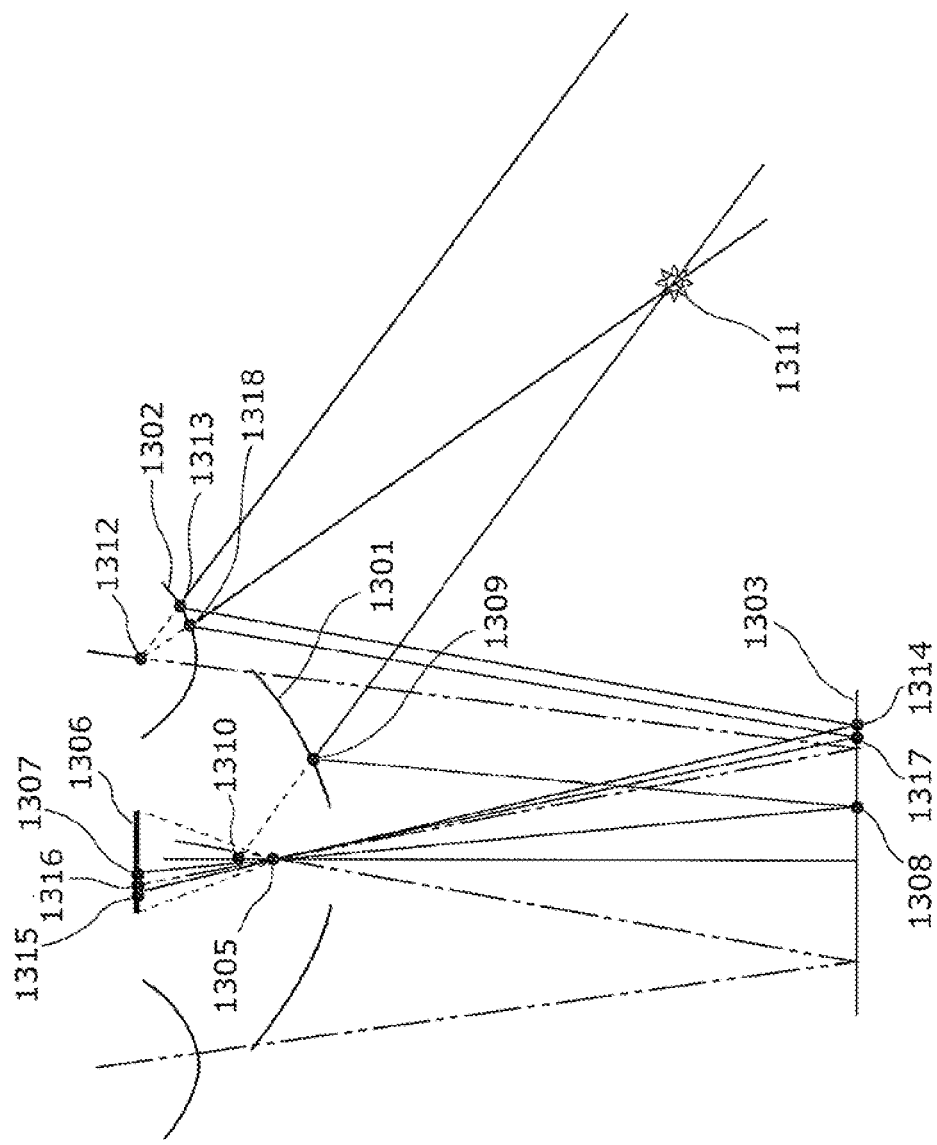
FIG. 8 is a conceptual diagram showing positioning vector computation in Embodiment 2 of the present invention.

The following describes the matching image information computation method in the matching image information computation unit 1205, with reference to FIG. 8. FIG. 8 is a schematic diagram for describing positioning vector computation in Embodiment 2 of the present invention. In FIG. 8, a primary mirror 1301, a secondary mirror 1302, a substantially plane mirror 1303, and a viewpoint 1305 are respectively the same as the primary mirror 101, the secondary mirror 102, the substantially plane mirror 103, and the viewpoint 105 shown in FIG. 1, and their description is omitted. An example where a subject designation point is given on the primary mirror is described below.

Suppose, for the camera viewpoint 1305 which is an entrance pupil position of a lens attached to the camera and an image plane 1306, omnidirectional image coordinates of a subject designation point 1307 are given in an image formed on the image plane 1306, as subject designation information.

Since light from the subject is incident along a line connecting the subject designation point 1307 and the viewpoint 1305, a substantially plane mirror intermediate point 1308 is determined as an intersection point of an extension of the line and the substantially plane mirror 1303. Since light from the subject is incident along the ray of light reflected at the substantially plane mirror intermediate point 1308, a straight line is computed by reflection calculation to thereby determine a primary mirror intermediate point 1309 as an intersection point of the straight line and the primary mirror. Reflection by the primary mirror assumes a straight line connecting the primary mirror intermediate point 1309 and a primary mirror inner focal point 1310 due to the single viewpoint property. Hence, a subject 1311 is present on the straight line.

Here, consider a straight line that is parallel to the straight line connecting the primary mirror inner focal point 1310 and the primary mirror intermediate point 1309 and that passes through a secondary mirror inner focal point 1312. This straight line is a vector of incident light on the secondary mirror in the case where the subject is present at infinity. A secondary mirror intermediate point 1313 is determined as an intersection point of the straight line corresponding to the incident light from infinity and the secondary mirror 1302. Reflection at the secondary mirror intermediate point 1313 is computed as a straight line toward an outer focal point of the secondary mirror 1302 due to the single viewpoint property. A substantially plane mirror intermediate point 1314 is then determined as an intersection point of the straight line of the reflection from the secondary mirror 1302 and the substantially plane mirror 1303. Light reflected at the substantially plane mirror intermediate point 1314 passes through the camera viewpoint 1305 that coincides with a point at which the outer focal point of the secondary mirror 1302 is reflected by the substantially plane mirror 1303, and enters the image plane 1306. Hence, an infinite point image point 1315 is determined as an intersection point of the light reflected at the substantially plane mirror intermediate point 1314 and the image plane 1306.

A plane including a subject and two viewpoints forming a stereo image is typically called an epipolar plane. In this example, the primary mirror inner focal point 1310, the secondary mirror inner focal point 1312, and the primary mirror intermediate point 1309 are present on the epipolar plane. A normal vector of the epipolar plane, which is necessary for generating the images used for matching, is obtained by a cross product of a vector from the primary mirror inner focal point 1310 to the primary mirror intermediate point 1309 and a vector from the primary mirror inner focal point 1310 to the secondary mirror inner focal point 1312. The normal vector of the epipolar plane, the image coordinates of the infinite point image point 1315, an image reduction ratio between the primary mirror and the secondary mirror (which can be roughly estimated by an image radius ratio of the primary mirror and the secondary mirror on the omnidirectional image 1210), and the like are outputted to the matching target image generation unit 1204 as the matching target image information 1211 in FIG. 7. In addition, the normal vector of the epipolar plane, the image coordinates of the subject designation point 1307, and the like are outputted to the matching source image generation unit 1203 as the matching source image information 1212 in FIG. 7.

The following describes the positioning computation method in the positioning computation unit 1207, with reference to FIG. 8. An omnidirectional image corresponding point 1316 in FIG. 8 is a corresponding point for the subject designation point 1307, i.e. a point obtained by returning (inverse transforming) matching target image coordinates computed by image matching into the omnidirectional image 1210.

Since light from the subject is incident along a line connecting the omnidirectional image corresponding point 1316 and the camera viewpoint 1305, a substantially plane mirror intermediate point 1317 is determined as an intersection point of an extension of the line and the substantially plane mirror 1303. Since light from the subject is incident along the ray of light reflected at the substantially plane mirror intermediate point 1317, a straight line is computed by reflection calculation to thereby determine a secondary mirror intermediate point 1318 as an intersection point of the straight line and the secondary mirror. Reflection by the secondary mirror assumes a straight line connecting the secondary mirror intermediate point 1318 and the secondary mirror inner focal point 1312 due to the single viewpoint property. Hence, the subject 1311 is present on the straight line. As mentioned earlier, the subject 1311 is also present on the straight line connecting the primary mirror inner focal point 1310 and the primary mirror intermediate point 1309. This being so, three-dimensional coordinates of the subject 1311 are determined as an intersection point of these two straight lines passing through the subject 1311.

Though the above describes the case where the subject designation point is given on the primary mirror in the process performed by the positioning unit 1208, positioning can also be performed even in the case where the subject designation point is given on one secondary mirror, by performing the same process between the secondary mirror and another secondary mirror.

Moreover, by combining the omnidirectional imaging system in this embodiment with the blind spot supplementation unit 205 in Embodiment 1, it is possible to realize a system capable of positioning for an omnidirectional image area whose blind spot is supplemented while ensuring a wide field of view. In this case, the subject designation point is given in the blind spot supplemented area. The subject designation point is associated with the corresponding subject designation point on the secondary mirror, by inverse computation of the blind spot supplementation process. Thus, positioning is possible even in the case where the subject designation point is given in the blind spot supplemented area by the positioning process between secondary mirrors.

Embodiment 3

Figure 9:
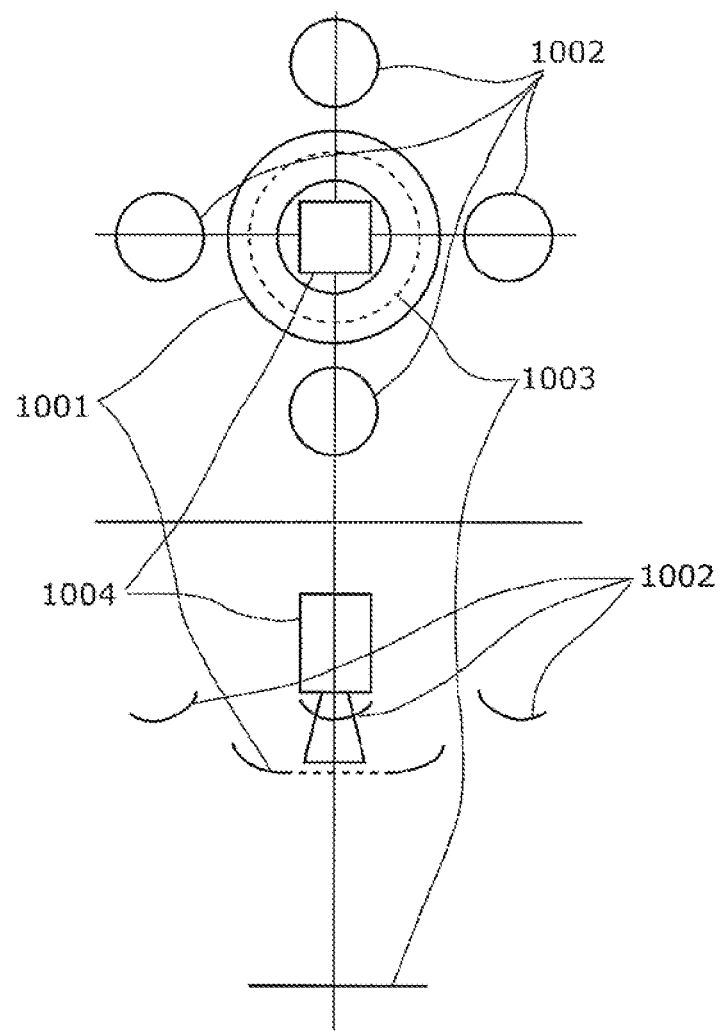
FIG. 9 is a schematic diagram showing an optical system structure of an omnidirectional imaging system in Embodiment 3 of the present invention.

FIG. 9 is a schematic diagram showing an optical system structure of an omnidirectional imaging system in Embodiment 3 of the present invention. In FIG. 9, a plan view and a front view are vertically associated with each other. The same components as those in FIG. 1 in Embodiment 1 of the present invention are given reference signs with the same last two digits, and their description is omitted.

In FIG. 9, a plurality of secondary mirrors 1002 are arranged so as not to overlap with a primary mirror 1001 in the plan view. Such an arrangement widens a range of a subject reflected by the secondary mirrors, contributing to a higher degree of freedom of blind spot supplementation.

Figure 10:
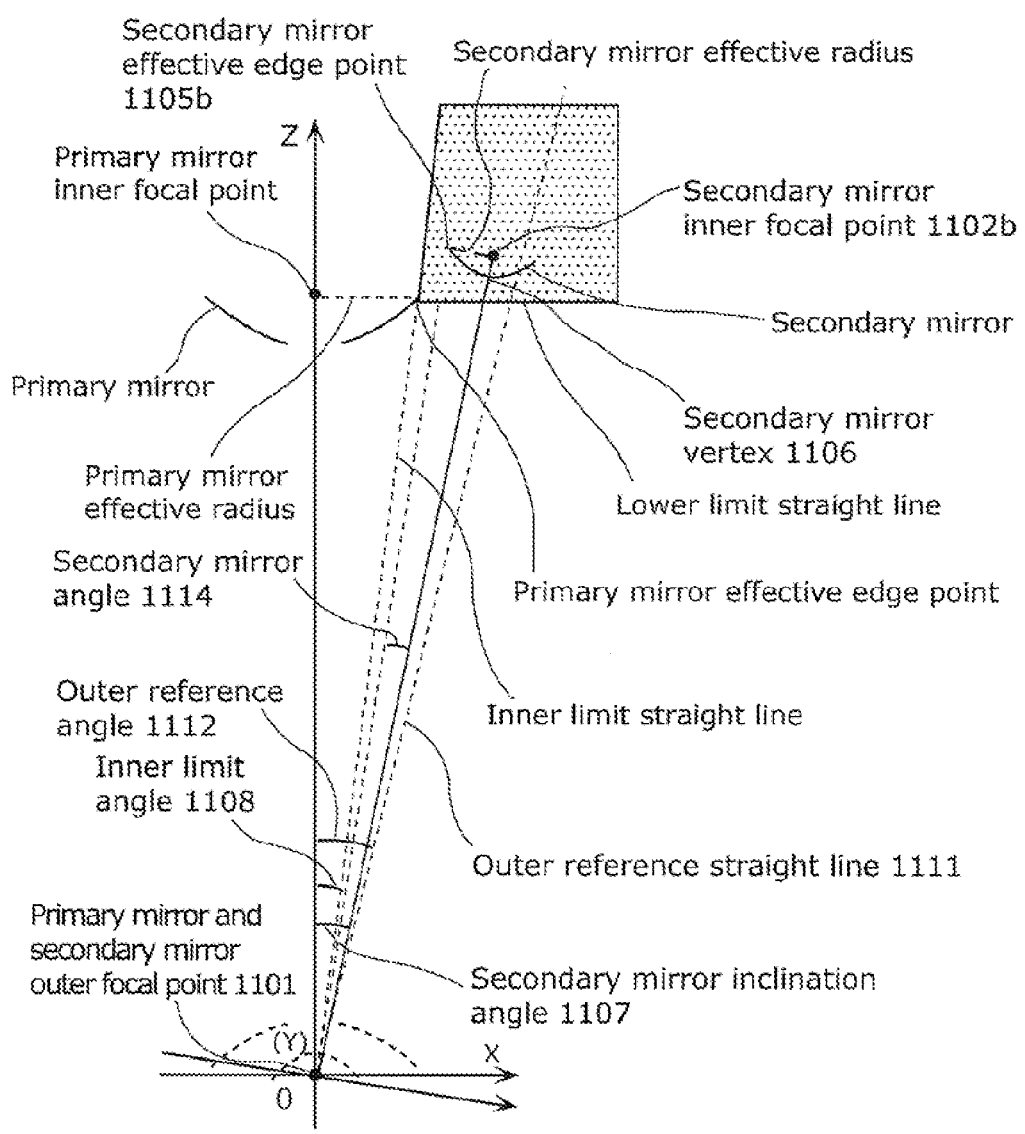
FIG. 10 is a diagram showing a positional relationship between a primary mirror and one of a plurality of secondary mirrors in Embodiment 3 of the present invention.

FIG. 10 is a diagram showing a positional relationship between the primary mirror and one of the plurality of secondary mirrors in Embodiment 3 of the present invention, using a coordinate system in which a plane including the focal points of the primary mirror and the secondary mirror is the X-Z plane as in FIG. 3. Note that the reflection by the substantially plane mirror is not shown in FIG. 10. The same components as those in FIG. 3 in Embodiment 1 of the present invention are given reference signs with the same last two digits, and their description is omitted.

In FIG. 10, a secondary mirror inclination angle 1107 is larger than the secondary mirror inclination angle 907 in FIG. 3, and an omnidirectional image reflected by the entire secondary mirror is captured by the camera. This contributes to a higher degree of freedom of blind spot supplementation, as described later. When the secondary mirror inclination angle 1107 is increased in such a manner, the range that can be imaged by the secondary mirror widens. As a captured image, however, the imaging size of the primary mirror relatively decreases in order to contain the secondary mirror within the image. This causes an increase in area having no effective image. To prevent such a situation, it seems practical to set a limit such as an outer reference straight line 1111 inclined by an outer reference angle 1112 and designing a position of a secondary mirror vertex 1106 within this range. In this embodiment, a secondary mirror angle 1114 which is an estimated angle of the secondary mirror is introduced for determining the outer reference angle 1112. Let $\theta_2$ be the secondary mirror angle 1114 which is an angle formed by a straight line connecting a secondary mirror inner focal point 1102*b* and a primary mirror and secondary mirror outer focal point 1101 and a straight line connecting a secondary mirror effective edge point 1105*b* and the primary mirror and secondary mirror outer focal point 1101 in FIG. 10.

Let $\theta_3$ be the outer reference angle 1112 which is an angle formed by the outer reference straight line 1111 and the central axis of the primary mirror (Z axis), and $\theta_1$ be an inner limit angle 1108, where $\theta_3 = \theta_1 + k\theta_2$. Let $(X_T, 0, z_T)$ be coordinates of the secondary mirror vertex 1106.

When $$z_T \geq \frac{1}{\tan(\theta_3)} x_T = \frac{1}{\tan(\theta_1 + k\theta_2)} x_T \qquad \text{[Math. 13]}$$

is satisfied, the secondary mirror vertex 1106 is situated inside the outer reference straight line 1111, that is, restricted within the practical range. Here, the coefficient k is desirably in a range of 0 to 2 or 3.

Figure 11:
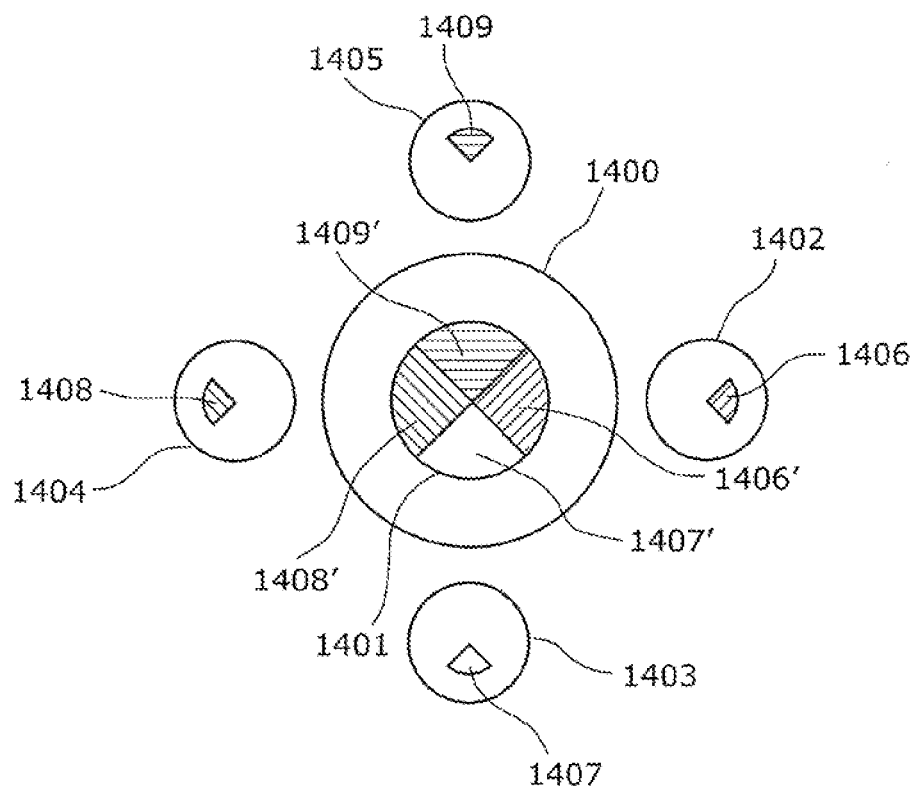
FIG. 11 is a first schematic diagram showing an example of a supplementation process performed on an image captured by the omnidirectional imaging system in Embodiment 3 of the present invention.
Figure 12:
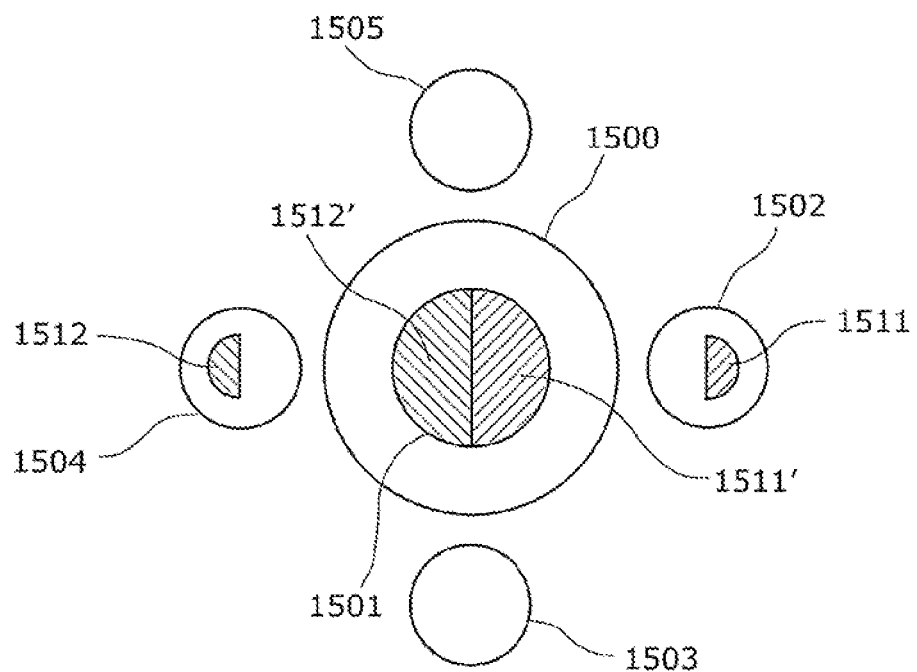
FIG. 12 is a second schematic diagram showing an example of a supplementation process performed on an image captured by the omnidirectional imaging system in Embodiment 3 of the present invention.
Figure 13:
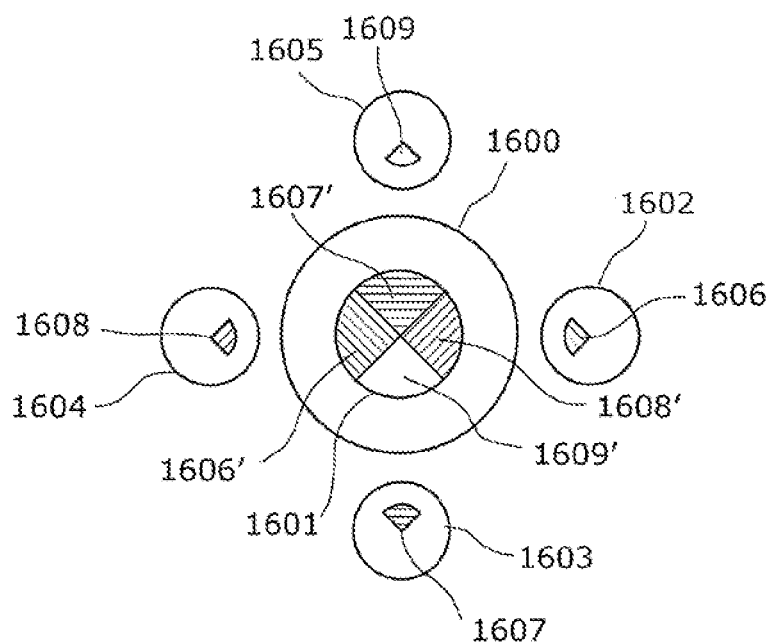
FIG. 13 is a third schematic diagram showing an example of a supplementation process performed on an image captured by the omnidirectional imaging system in Embodiment 3 of the present invention.

FIGS. 11, 12, and 13 are each a schematic diagram showing an example of a supplementation process performed on an image captured by the omnidirectional imaging system in Embodiment 3 of the present invention shown in FIG. 9. The omnidirectional imaging system in this embodiment includes the blind spot supplementation unit 205.

In FIG. 11, the blind spot supplementation unit 205 clips a part of each of secondary mirror image areas 1402 to 1405 and pastes the clipped part in a blind spot area 1401 of a primary mirror image area 1400, thereby supplementing an image of the blind spot area 1401, as in FIG. 5 in Embodiment 1 of the present invention. In detail, the blind spot supplementation unit 205 associates a partial image area 1406 of the secondary mirror image area 1402 with a corresponding part 1406' of the blind spot area 1401. The blind spot supplementation unit 205 also associates a partial image area 1407 of the secondary mirror image area 1403 with a corresponding part 1407' of the blind spot area 1401. The blind spot supplementation unit 205 also associates a partial image area 1408 of the secondary mirror image area 1404 with a corresponding part 1408' of the blind spot area 1401. The blind spot supplementation unit 205 also associates a partial image area 1409 of the secondary mirror image area 1405 with a corresponding part 1409' of the blind spot area 1401. By such association, the blind spot supplementation unit 205 supplements the blind spot area 1401.

In FIG. 12, the blind spot supplementation unit 205 clips, from among secondary mirror image areas 1502 to 1505, a part of each of the secondary mirror image areas 1502 and 1504 and pastes the clipped part in a blind spot area 1501 of a primary mirror image area 1500, thereby supplementing an image of the blind spot area 1501, as in the example of the supplementation process in FIG. 6 in Embodiment 1 of the present invention. In detail, the blind spot supplementation unit 205 associates a partial image area 1511 of the secondary mirror image area 1502 with a corresponding part 1511' of the blind spot area 1501. The blind spot supplementation unit 205 also associates a partial image area 1512 of the secondary mirror image area 1504 with a corresponding part 1512' of the blind spot area 1501. By such association, the blind spot supplementation unit 205 supplements the blind spot area 1501.

FIG. 13 shows an example where blind spot supplementation can also be performed using a partial image area of a secondary mirror closer to a primary mirror. The blind spot supplementation unit 205 clips a part of each of secondary mirror image areas 1602 to 1605 and pastes the clipped part in a blind spot area 1601 of a primary mirror image area 1600, thereby supplementing an image of the blind spot area 1601. Though FIG. 13 is similar to FIG. 11, the association between the blind spot area 1601 and the secondary mirrors is different. In detail, the blind spot supplementation unit 205 associates a partial image area 1606 of the secondary mirror image area 1602 with a corresponding part 1606' of the blind spot area 1601. The blind spot supplementation unit 205 also associates a partial image area 1607 of the secondary mirror image area 1603 with a corresponding part 1607' of the blind spot area 1601. The blind spot supplementation unit 205 also associates a partial image area 1608 of the secondary mirror image area 1604 with a corresponding part 1608' of the blind spot area 1601. The blind spot supplementation unit 205 also associates a partial image area 1609 of the secondary mirror image area 1605 with a corresponding part 1609' of the blind spot area 1601. By such association, the blind spot supplementation unit 205 supplements the blind spot area 1601.

Embodiment 4

Figure 14:
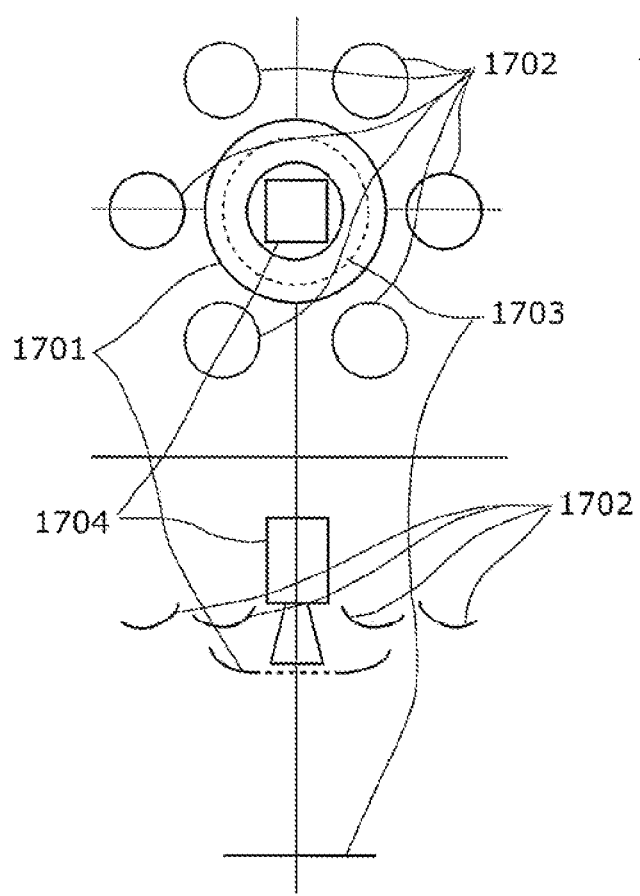
FIG. 14 is a schematic diagram showing an optical system structure of an omnidirectional imaging system in Embodiment 4 of the present invention.

FIG. 14 is a schematic diagram showing an optical system structure of an omnidirectional imaging system in Embodiment 4 of the present invention. In FIG. 14, a plan view and a front view are vertically associated with each other. The same components as those in FIG. 1 in Embodiment 1 of the present invention are given reference signs with the same last two digits, and their description is omitted.

In FIG. 14, there are six secondary mirrors 1702 that are arranged so as not to overlap with a primary mirror in the plan view. Such an arrangement widens a range of a subject reflected by the secondary mirrors, contributing to a higher degree of freedom of blind spot supplementation.

Figure 15:
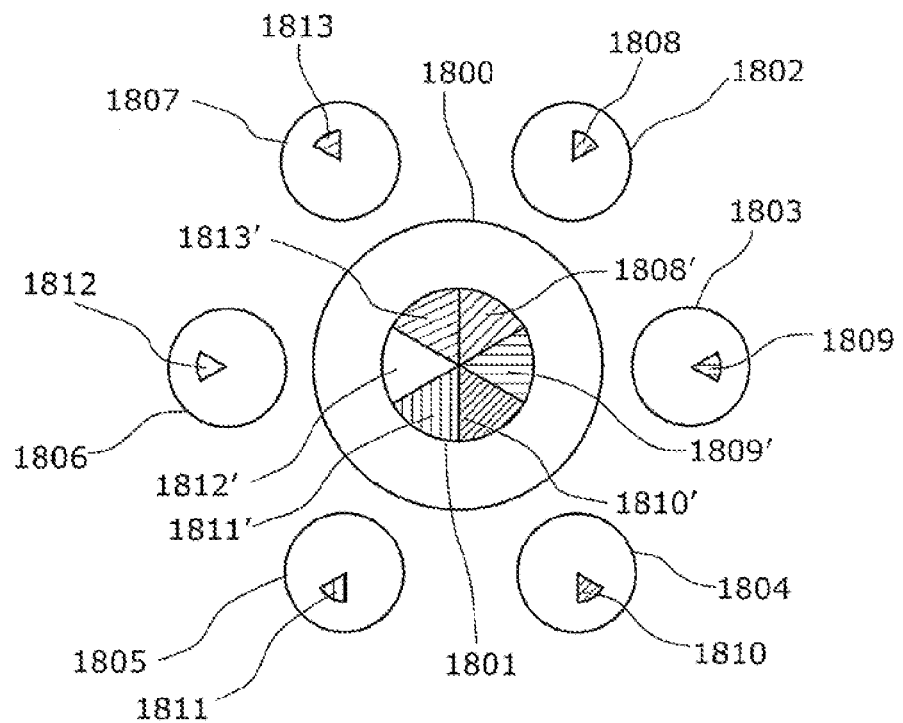
FIG. 15 is a first schematic diagram showing an example of a supplementation process performed on an image captured by the omnidirectional imaging system in Embodiment 4 of the present invention.
Figure 16:
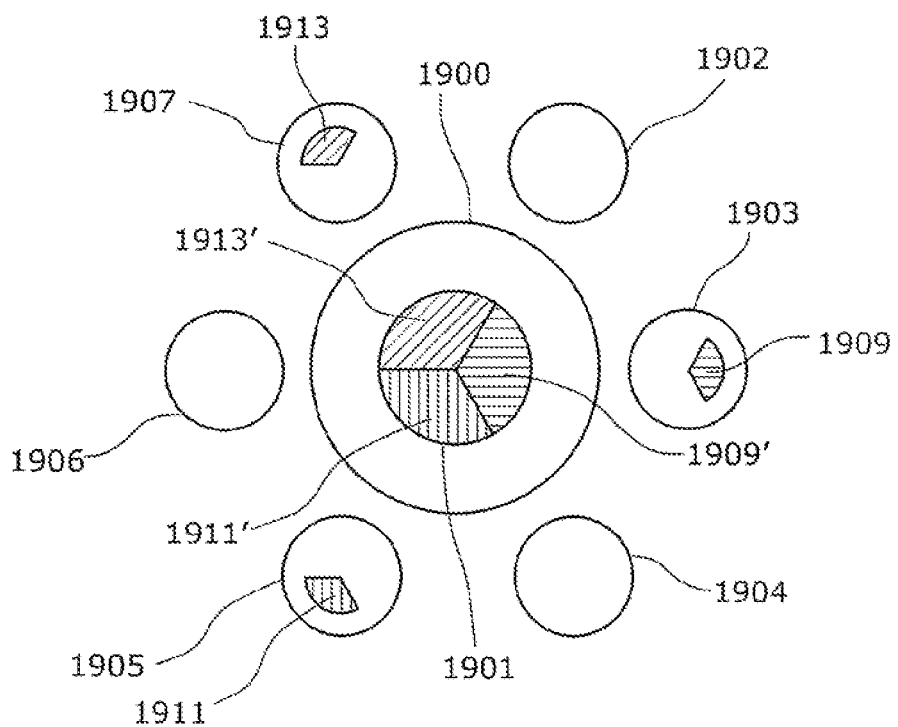
FIG. 16 is a second schematic diagram showing an example of a supplementation process performed on an image captured by the omnidirectional imaging system in Embodiment 4 of the present invention.
Figure 17:
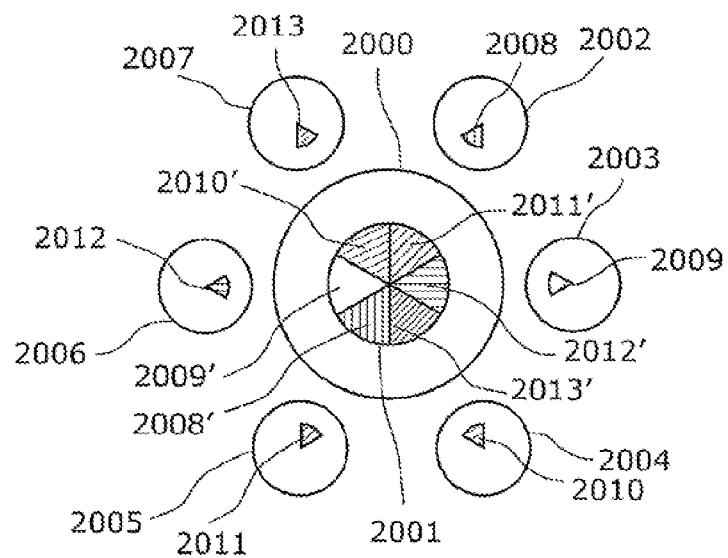
FIG. 17 is a third schematic diagram showing an example of a supplementation process performed on an image captured by the omnidirectional imaging system in Embodiment 4 of the present invention.

FIGS. 15, 16, and 17 are each a schematic diagram showing an example of a supplementation process performed on an image captured by the omnidirectional imaging system in Embodiment 4 of the present invention shown in FIG. 14. Note that the omnidirectional imaging system in this embodiment includes the blind spot supplementation unit 205.

In FIG. 15, the blind spot supplementation unit 205 clips a part of each of secondary mirror image areas 1802 to 1807 and pastes the clipped part in a blind spot area 1801 of a primary mirror image area 1800, thereby supplementing an image of the blind spot area 1801, as in FIG. 5 in Embodiment 1 of the present invention. In detail, the blind spot supplementation unit 205 associates a partial image area 1808 of the secondary mirror image area 1802 with a corresponding part 1808' of the blind spot area 1801. The blind spot supplementation unit 205 also associates a partial image area 1809 of the secondary mirror image area 1803 with a corresponding part 1809' of the blind spot area 1801. The blind spot supplementation unit 205 also associates a partial image area 1810 of the secondary mirror image area 1804 with a corresponding part 1810' of the blind spot area 1801. The blind spot supplementation unit 205 also associates a partial image area 1811 of the secondary mirror image area 1805 with a corresponding part 1811' of the blind spot area 1801. The blind spot supplementation unit 205 also associates a partial image area 1812 of the secondary mirror image area 1806 with a corresponding part 1812' of the blind spot area 1801. The blind spot supplementation unit 205 also associates a partial image area 1813 of the secondary mirror image area 1807 with a corresponding part 1813' of the blind spot area 1801. By such association, the blind spot supplementation unit 205 supplements the blind spot area 1801.

FIG. 16 shows a supplementation process that uses three secondary mirrors out of the six secondary mirrors. The blind spot supplementation unit 205 clips, from among secondary mirror image areas 1902 to 1907, a part of each of the secondary mirror image areas 1903, 1905, and 1907 and pastes the clipped part in a blind spot area 1901 of a primary mirror image area 1900, thereby supplementing an image of the blind spot area 1901. In detail, the blind spot supplementation unit 205 associates a partial image area 1909 of the secondary mirror image area 1903 with a corresponding part 1909' of the blind spot area 1901. The blind spot supplementation unit 205 also associates a partial image area 1911 of the secondary mirror image area 1905 with a corresponding part 1911' of the blind spot area 1901. The blind spot supplementation unit 205 also associates a partial image area 1913 of the secondary mirror image area 1907 with a corresponding part 1913' of the blind spot area 1901. By such association, the blind spot supplementation unit 205 supplements the blind spot area 1901.

FIG. 17 shows an example where blind spot supplementation can also be performed using a partial image area of a secondary mirror closer to a primary mirror. The blind spot supplementation unit 205 clips a part of each of secondary mirror image areas 2002 to 2007 and pastes the clipped part in a blind spot area 2001 of a primary mirror image area 2000, thereby supplementing an image of the blind spot area 2001. Though FIG. 17 is similar to FIG. 15, the association between the blind spot area 2001 and the secondary mirrors is different. In detail, the blind spot supplementation unit 205 associates a partial image area 2008 of the secondary mirror image area 2002 with a corresponding part 2008' of the blind spot area 2001. The blind spot supplementation unit 205 also associates a partial image area 2009 of the secondary mirror image area 2003 with a corresponding part 2009' of the blind spot area 2001. The blind spot supplementation unit 205 also associates a partial image area 2010 of the secondary mirror image area 2004 with a corresponding part 2010' of the blind spot area 2001. The blind spot supplementation unit 205 also associates a partial image area 2011 of the secondary mirror image area 2005 with a corresponding part 2011' of the blind spot area 2001. The blind spot supplementation unit 205 also associates a partial image area 2012 of the secondary mirror image area 2006 with a corresponding part 2012' of the blind spot area 2001. The blind spot supplementation unit 205 also associates a partial image area 2013 of the secondary mirror image area 2007 with a corresponding part 2013' of the blind spot area 2001. By such association, the blind spot supplementation unit 205 supplements the blind spot area 2001.

Embodiment 5

Figure 18:
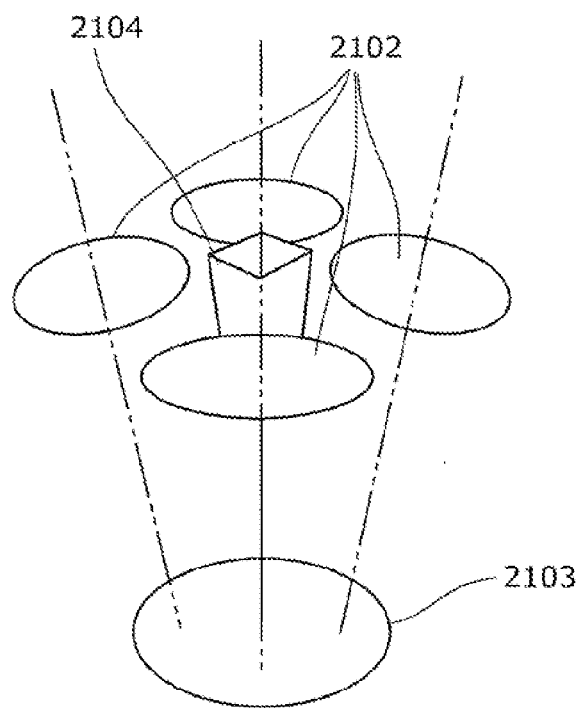
FIG. 18 is a diagram showing an optical system structure of an omnidirectional imaging system in Embodiment 5 of the present invention.

FIG. 18 is a diagram showing an optical system structure of an omnidirectional imaging system in Embodiment 5 of the present invention.

In FIG. 18, a camera 2104 captures an omnidirectional image reflected by a plurality of hyperbolic mirrors 2102 and further reflected by a substantially plane mirror 2103. When compared with Embodiment 1 of the present invention shown in FIG. 1 and Embodiment 3 of the present invention shown in FIG. 9, the optical system structure in Embodiment 5 corresponds to a situation where a primary mirror has a larger blind spot and is entirely covered with the blind spot. Since the primary mirror itself is a blind spot, the primary mirror is unnecessary. By inclining a central axis of each of the plurality of hyperbolic mirrors (corresponding to secondary mirrors) in an inward direction in which vertices of the plurality of hyperbolic mirrors face each other, outer focal points of hyperboloids of the plurality of hyperbolic mirrors are made to coincide with each other. A camera viewpoint is placed at this position of the outer focal point of each of the plurality of hyperbolic mirrors or a position at which the outer focal point is reflected by the substantially plane mirror (i.e. a position symmetrical to the outer focal point about the substantially plane mirror), as in Embodiment 1 of the present invention.

Figure 19:
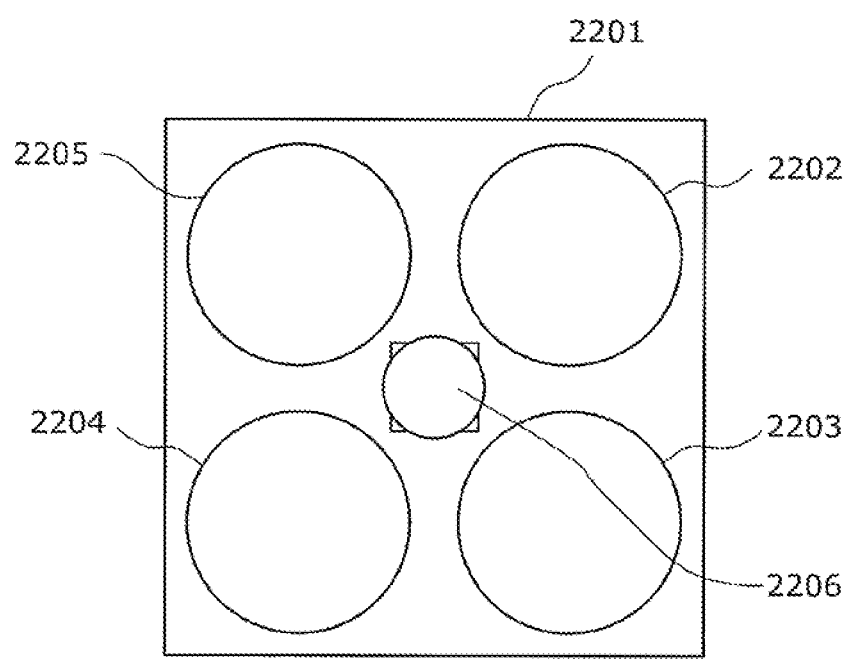
FIG. 19 is a schematic diagram showing an image captured by the omnidirectional imaging system in Embodiment 5 of the present invention.

FIG. 19 is a schematic diagram showing an image captured by the omnidirectional imaging system in Embodiment 5 of the present invention.

In FIG. 19, an image 2206 of the camera itself is captured at a center of a captured image 2201, while images reflected by the hyperbolic mirrors are captured as hyperbolic mirror image areas 2202 and 2205.

Figure 20:
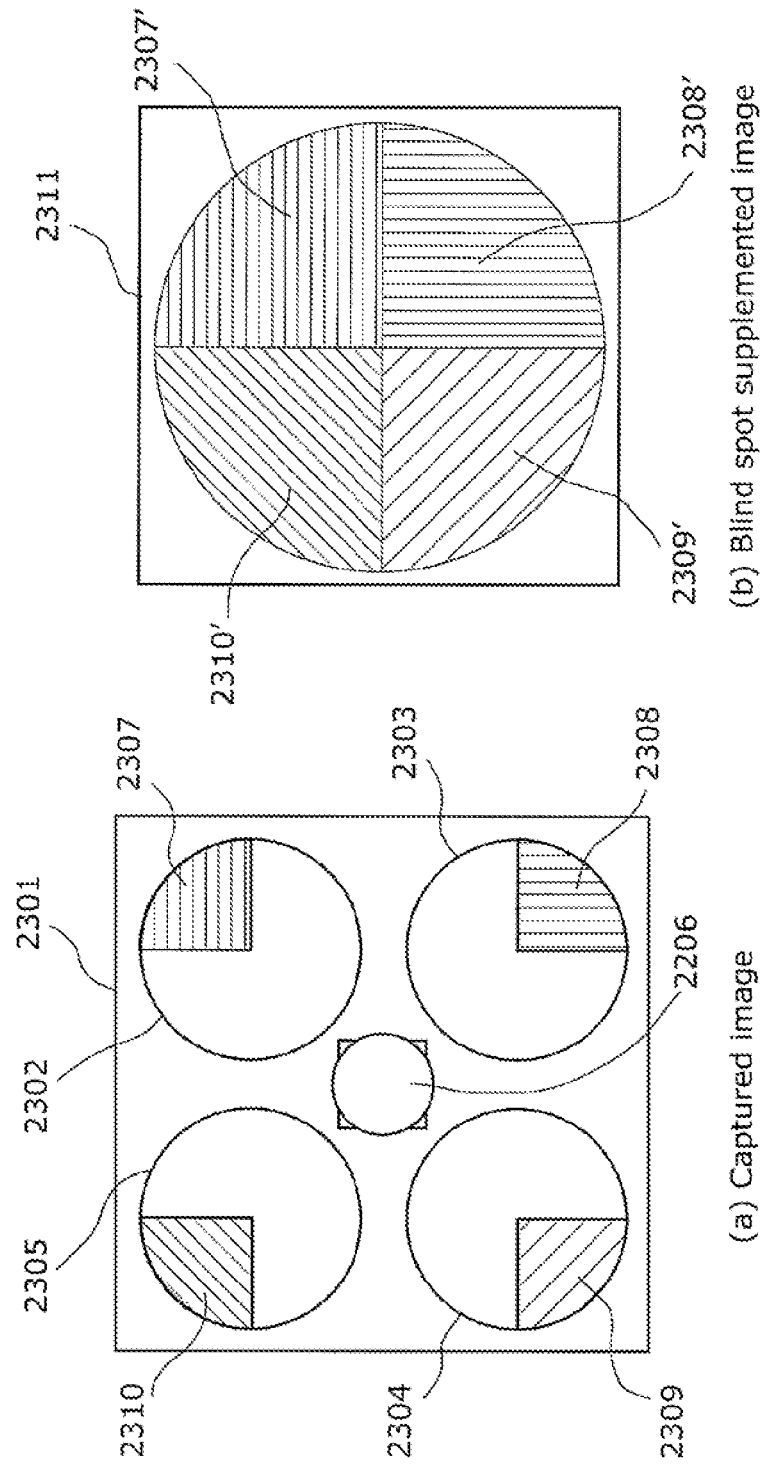
FIG. 20 is a diagram for describing a supplementation process by the omnidirectional imaging system in Embodiment 5 of the present invention, where

FIG. 20 is a schematic diagram showing an example of a supplementation process performed on an image captured by the omnidirectional imaging system in Embodiment 5 of the present invention shown in FIG. 18.

In FIG. 20, an entire primary mirror image area is a blind spot area. Accordingly, there is no primary mirror image area in a captured image 2301 shown in FIG. 20(a). This being the case, a blind spot supplemented image 2311 shown in FIG. 20(b) is generated to generate a blind-spot-supplemented omnidirectional image. Each hyperbolic mirror has reflection images of the other hyperboloids seen therein, and therefore partially has a blind spot area. To obtain the blind spot supplemented image 2311 with no blind spot by excluding these blind spot areas, the blind spot supplementation unit 205 clips a part of each of hyperbolic mirror image areas 2302 to 2305 in the captured image 2301 and pastes the clipped part, thereby generating the blind spot supplemented image 2311.

In detail, the blind spot supplementation unit 205 associates a partial image area 2307 of the hyperbolic mirror image area 2302 with a corresponding part 2307' of the blind spot supplemented image 2311. The blind spot supplementation unit 205 also associates a partial image area 2308 of the hyperbolic mirror image area 2303 with a corresponding part 2308' of the blind spot supplemented image 2311. The blind spot supplementation unit 205 also associates a partial image area 2309 of the hyperbolic mirror image area 2304 with a corresponding part 2309' of the blind spot supplemented image 2311. The blind spot supplementation unit 205 also associates a partial image area 2310 of the hyperbolic mirror image area 2305 with a corresponding part 2310' of the blind spot supplemented image 2311. By such association, the blind spot supplementation unit 205 synthesizes the blind spot supplemented image 2311.

Such a process can be achieved by the image processing structure of the blind spot supplementation unit in FIG. 4 in Embodiment 1 of the present invention. Note, however, that the synthesis parameter shown in FIG. 4 is, for example, a combination of a coordinate value in the blind spot supplemented image 2311 and a coordinate value in the captured image 2301 corresponding to the point, because there is no primary mirror area in this embodiment.

Though FIG. 20 shows an example where an area of ¼ from each hyperbolic mirror is used for synthesis, various other area selection methods for synthesis, such as ½ or ⅓, are also applicable given that there is a substantial overlap between the hyperbolic mirrors in Embodiment 5.

Embodiment 6

Figure 21:
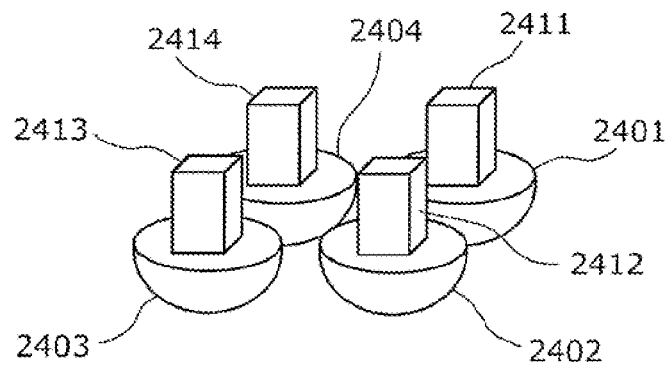
FIG. 21 is an external view of an imaging system structure of an omnidirectional imaging system in Embodiment 6 of the present invention.
Figure 22:
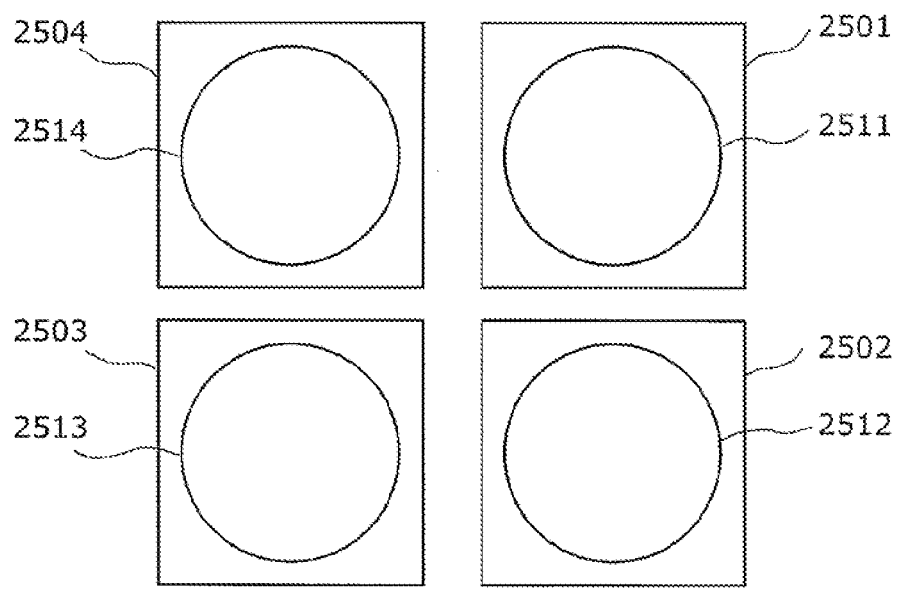
FIG. 22 is a schematic diagram showing an image captured by the omnidirectional imaging system in Embodiment 6 of the present invention.

FIG. 21 is an external view of an imaging system structure of an omnidirectional imaging system in Embodiment 6 of the present invention. In FIG. 21, four omnidirectional imaging devices that are four cameras 2411 to 2414 respectively combined with four fisheye lenses 2401 to 2404 are used so that each omnidirectional imaging device captures an omnidirectional image. FIG. 22 is a schematic diagram showing an image captured by the omnidirectional imaging system in Embodiment 6 of the present invention. That is, the omnidirectional imaging system in this embodiment captures an image as shown in FIG. 22. In detail, an image captured by the fisheye lens 2401 and the camera 2411 in FIG. 21 constitutes an omnidirectional image area 2511 in a captured image 2501. An image captured by the fisheye lens 2402 and the camera 2412 in FIG. 21 constitutes an omnidirectional image area 2512 in a captured image 2502. An image captured by the fisheye lens 2403 and the camera 2413 in FIG. 21 constitutes an omnidirectional image area 2513 in a captured image 2503. An image captured by the fisheye lens 2404 and the camera 2414 in FIG. 21 constitutes an omnidirectional image area 2514 in a captured image 2504. Each of these omnidirectional image areas 2511 to 2514 contains reflection images of the three fisheye lenses other than the fisheye lens that captures the omnidirectional image, which form a blind spot in the omnidirectional image. This blind spot, however, is imaged by the reflected fisheye lenses. Therefore, by synthesizing parts with no blind spot from the images 2501 to 2504 captured by the four pairs of fisheye lenses and cameras, one supplemental synthetic image with no blind spot area can be generated.

Note that, in this embodiment, an image with no blind spot area means an image that does not include any blind spot area where image information is missing.

Figure 23:
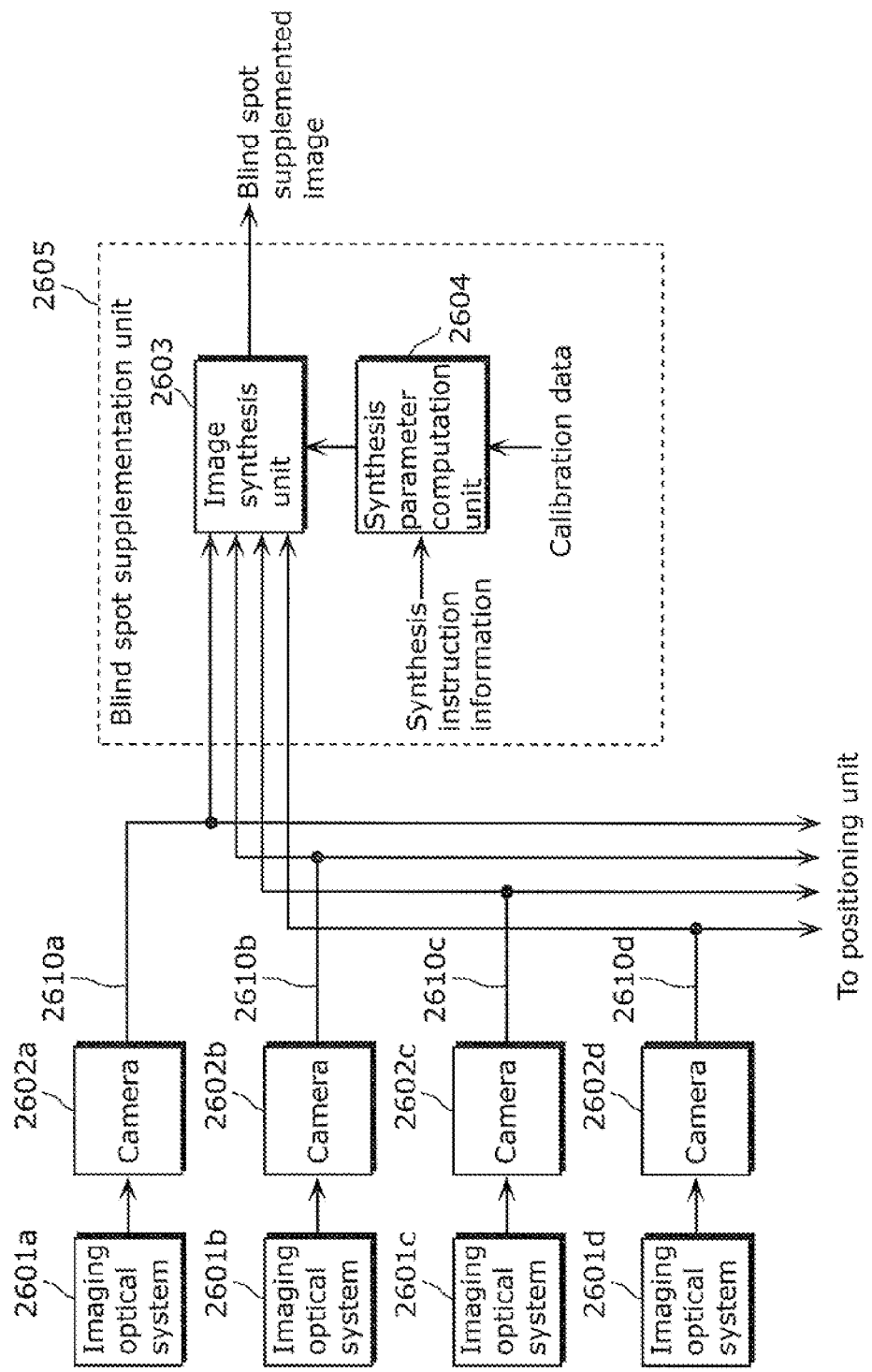
FIG. 23 is a diagram showing an image processing structure of a blind spot supplementation unit in Embodiment 6 of the present invention.

FIG. 23 is a diagram showing an image processing structure of a blind spot supplementation unit in Embodiment 6 of the present invention.

In FIG. 23, four imaging optical systems and four cameras same as the imaging optical system and the camera in FIG. 4 in Embodiment 1 of the present invention are included in the omnidirectional imaging system in Embodiment 6 of the present invention, where the same components as those in FIG. 4 are given reference signs with the same last two digits except English letters a to d. The four imaging optical systems and the four cameras are identified by adding a to d to the reference signs.

In FIG. 4, one omnidirectional image 210 includes an omnidirectional image captured by the primary mirror and the plurality of secondary mirrors. In FIG. 23, on the other hand, omnidirectional images 2610a to 2610d are obtained by the four omnidirectional imaging devices (each of which is composed of an imaging optical system (fisheye lens) and a camera) and inputted to an image synthesis unit 2603. The image synthesis unit 2603 performs the below-mentioned supplementation process to output a blind spot supplemented image. A blind spot supplementation unit 2605 includes the image synthesis unit 2603 and a synthesis parameter computation unit 2604, and receives a camera image as an input and outputs a blind spot supplemented image.

The synthesis parameter computation unit 2604 computes a synthesis parameter for performing the supplementation process, from calibration data indicating the structure and property of the optical system and synthesis instruction information designating a condition that requires adjustment (e.g. a height, a distance from the camera, a camera viewpoint position, and the like that require adjustment). The image synthesis unit 2603 performs the supplementation synthesis process on the blind spot area according to the synthesis parameter computed by the synthesis parameter computation unit 2604, and outputs a resulting image as the blind spot supplemented image. For instance, the synthesis parameter is a combination of a coordinate value in the blind spot supplemented image and an image number of an omnidirectional image and a coordinate value in the omnidirectional image corresponding to the point. The synthesis parameter may include only a combination of representative points, where the supplementation process is performed by computing the inside of a polygon formed by the representative points by linear interpolation in the image synthesis unit 2603 or the synthesis parameter computation unit 2604, as in the omnidirectional imaging system in Embodiment 1. Besides, the image synthesis unit 2603 may perform image processing, such as adjusting an overall luminance mean value, on the omnidirectional images 2610a to 2610d for enhancing synthetic image quality, prior to the synthesis of the blind spot supplemented image.

Figure 24:
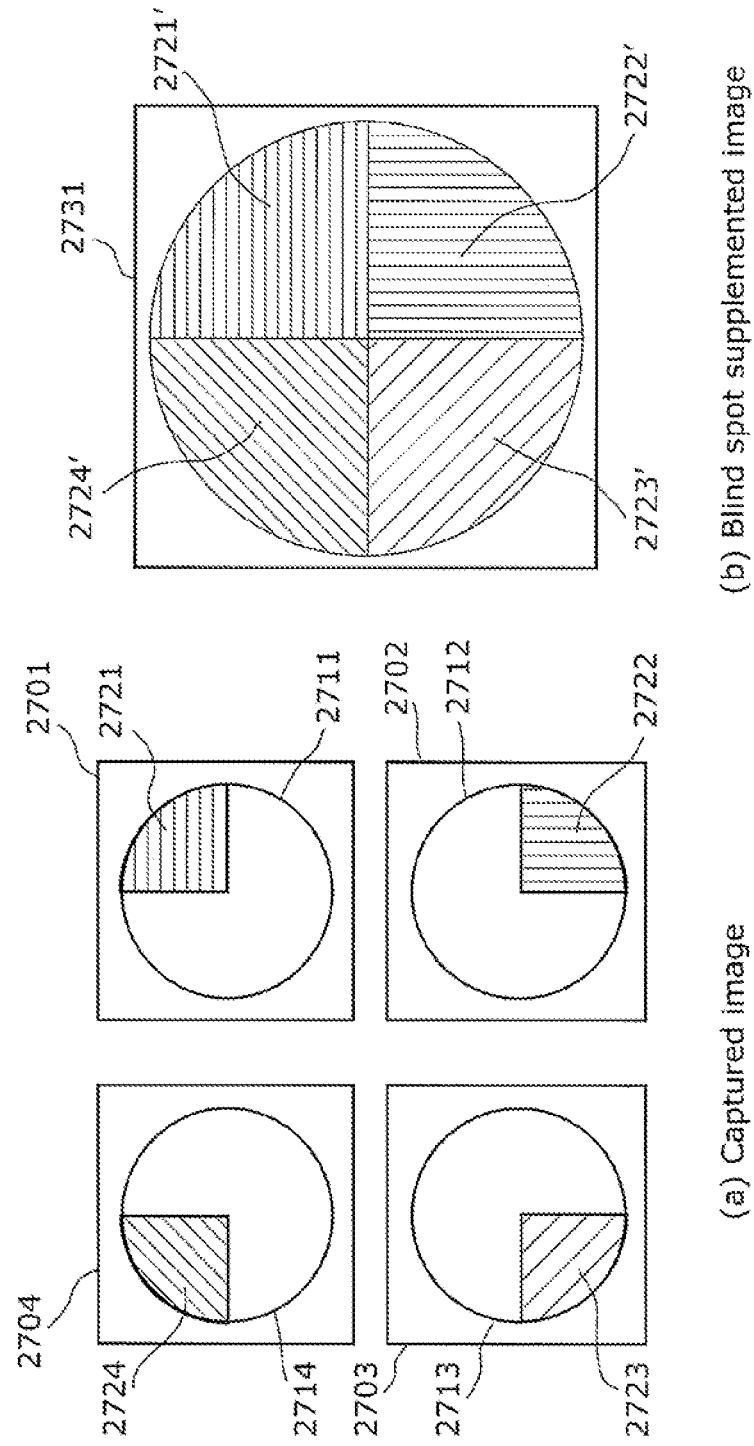
FIG. 24 is a diagram for describing a supplementation process by the omnidirectional imaging system in Embodiment 6 of the present invention, where

FIG. 24 is a schematic diagram showing an example of a supplementation process performed on an image captured by the omnidirectional imaging system in Embodiment 6 of the present invention shown in FIG. 21.

A captured image shown in FIG. 24(a) can be regarded as the captured image shown in FIG. 20(a) in Embodiment 5 of the present invention divided into four, and a blind spot supplemented image 2731 shown in FIG. 24(b) is synthesized as in Embodiment 5 of the present invention. Each omnidirectional image contains reflection images of the other fisheye cameras, and therefore partially has a blind spot area. To obtain the blind spot supplemented image 2731 with no blind spot by excluding these blind spot areas, the blind spot supplementation unit 2605 clips a part of each of omnidirectional image areas 2711 to 2714 in captured images 2701 to 2704 and pastes the clipped part, thereby generating the blind spot supplemented image 2731.

In detail, the blind spot supplementation unit 2605 associates a partial image area 2721 of the omnidirectional image area 2711 with a corresponding part 2721' of the blind spot supplemented image 2731. The blind spot supplementation unit 2605 also associates a partial image area 2722 of the omnidirectional image area 2712 with a corresponding part 2722' of the blind spot supplemented image 2731. The blind spot supplementation unit 2605 also associates a partial image area 2723 of the omnidirectional image area 2713 with a corresponding part 2723' of the blind spot supplemented image 2731. The blind spot supplementation unit 2605 also associates a partial image area 2724 of the omnidirectional image area 2714 with a corresponding part 2724' of the blind spot supplemented image 2731. By such association, the blind spot supplementation unit 2605 synthesizes the blind spot supplemented image 2731.

Though FIG. 24 shows an example where an area of ¼ from each fisheye camera image is used for synthesis, various other area selection methods for synthesis are also applicable given that there is a substantial overlap between the fisheye camera images in Embodiment 6. For example, it is also possible to select one of the omnidirectional image areas 2711 to 2714 and synthesize only a blind spot area of the selected omnidirectional image area from the other omnidirectional image areas.

Figure 25:
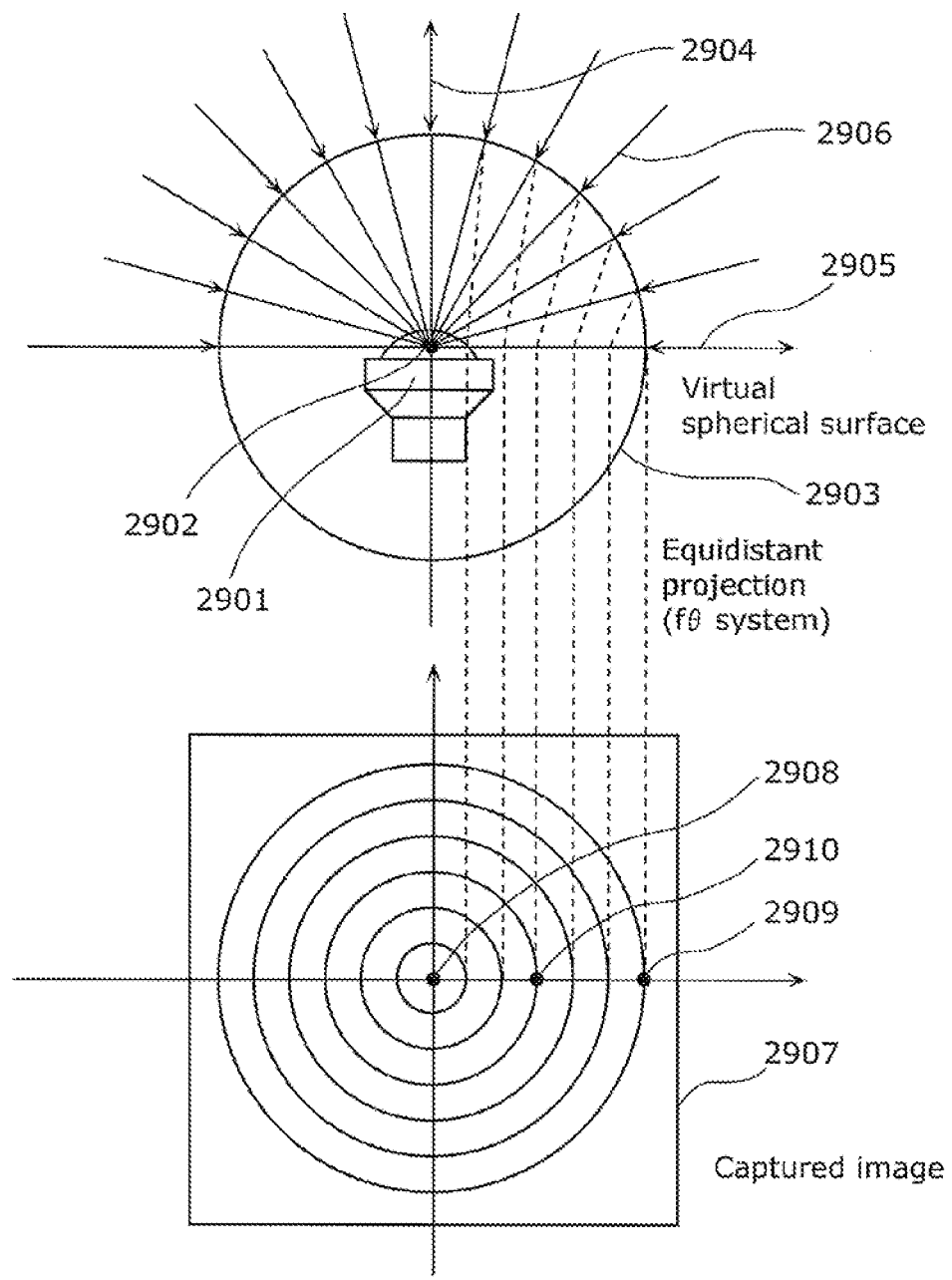
FIG. 25 is a schematic diagram showing a relationship between an angle of incident light and an image point in a captured image in equidistant projection.

The following describes an imaging property of a fisheye camera, with reference to FIG. 25. As described in NPL 2, there are several types of fisheye camera projection methods. Of these, equidistant projection (also referred to as fθ system) is widely used. FIG. 25 is a schematic diagram showing a relationship between an angle of incident light and an image point in a captured image in equidistant projection. A fisheye lens 2901, a virtual viewpoint 2902 of the fisheye lens 2901, a virtual spherical surface 2903 about the virtual viewpoint 2902, incident light 2904 to 2906 from various angles, a captured image 2907, and projective points 2908 to 2910 corresponding to the incident light 2904 to 2906 are shown in FIG. 25. The virtual spherical surface 2903 is assumed to be about the virtual viewpoint 2902 of the fisheye lens 2901. Light incident from outside this spherical surface toward the virtual viewpoint 2902 is projected by the fisheye lens 2901. The incident light 2904 along an optical axis has an angle of 0 degree with the optical axis, and is projected at the projective point 2908 at a center of the captured image 2907. Meanwhile, the incident light 2905 in a direction of an angle of 90 degrees with the optical axis is projected at the projective point 2909 at a predetermined distance from the projective point 2908 at the center of the captured image 2907. Light incident at an intermediate angle between the incident light 2904 and the incident light 2905 is projected at a position proportional to the angle of incidence, in the captured image 2907. For example, the incident light 2906 in a direction of an angle of 45 degrees with the optical axis is projected at the projective point 2910 which is a midpoint between the projective point 2908 and the projective point 2909. The above describes the case where the virtual viewpoint 2902 is a single point. To be more precise, however, the virtual viewpoint 2902 slightly moves on the optical axis depending on the angle of incidence.

Figure 26:
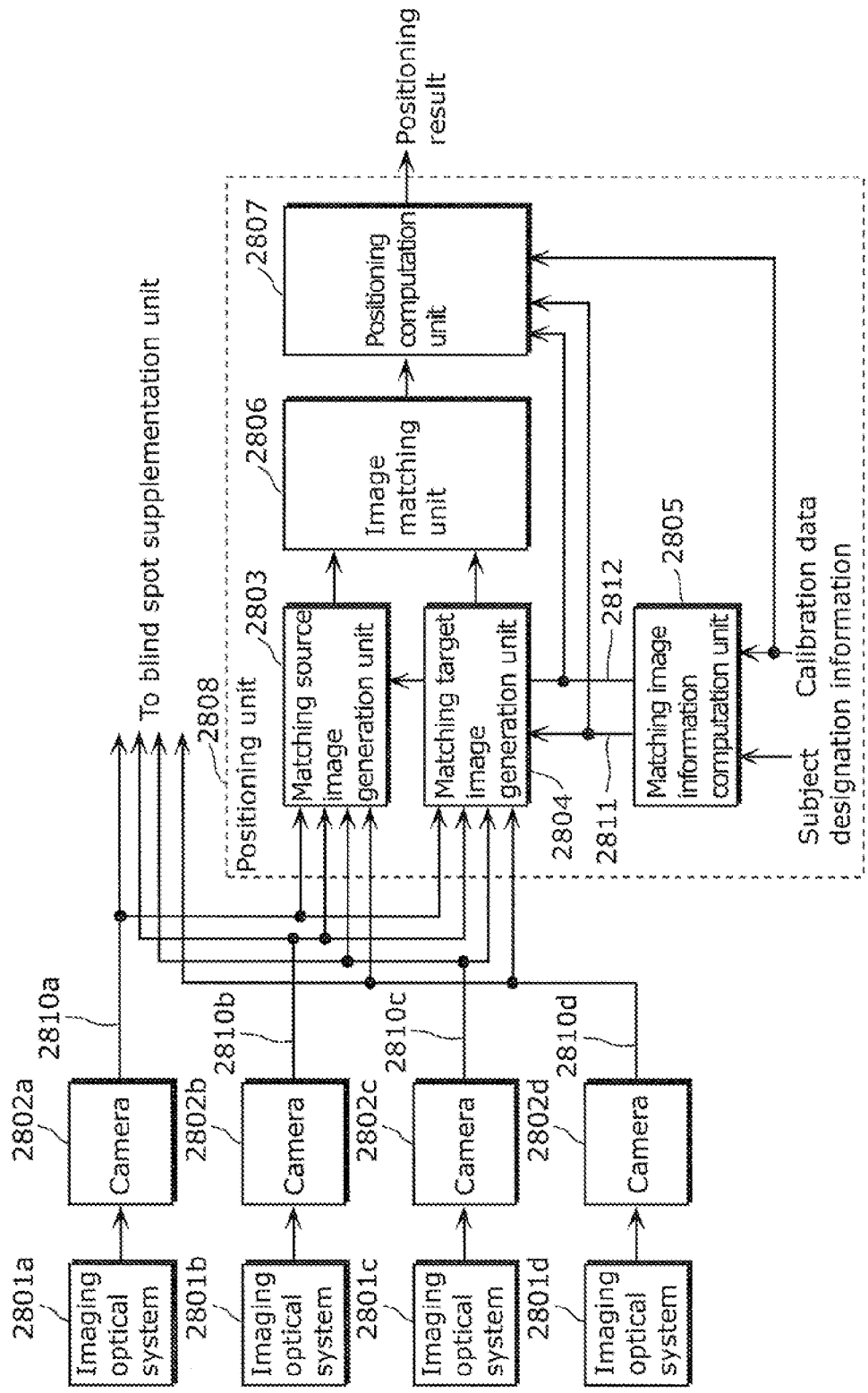
FIG. 26 is a diagram showing an image processing structure of a positioning unit in Embodiment 6 of the present invention.

FIG. 26 is a diagram showing an image processing structure of a positioning unit 2808 in Embodiment 6 of the present invention In FIG. 26, four imaging optical systems and four cameras same as the imaging optical system and the camera in FIG. 7 in Embodiment 2 of the present invention are included in the omnidirectional imaging system in Embodiment 6 of the present invention, where the same components as those in FIG. 7 are given reference signs with the same last two digits except English letters a to d. The four imaging optical systems and the four cameras are identified by adding a to d to the reference signs.

In FIG. 7, one omnidirectional image 1210 includes an omnidirectional image captured by the primary mirror and the plurality of secondary mirrors. In FIG. 26, on the other hand, omnidirectional images 2810a to 2810d are obtained by the four omnidirectional imaging devices (each of which is composed of an imaging optical system (fisheye lens) and a camera) and inputted to a matching source image generation unit 2803 and a matching target image generation unit 2804. The matching source image generation unit 2803 and the matching target image generation unit 2804 generate images used for image matching from the omnidirectional images 2810a to 2810d, according to matching image information (i.e. matching source image information 2812 and matching target image information 2811). A matching image information computation unit 2805 computes the matching image information by the below-mentioned matching image information computation method, according to supplied subject designation information and calibration data (including a three-dimensional position and direction of each fisheye camera).

An image matching unit 2806 searches the matching target image for a part that has a highest degree of coincidence with the matching source image, and computes and outputs coordinates in the matching target image. A positioning computation unit 2807 performs inverse transformation on coordinates in the matching target image outputted from the image matching unit 2806, with reference to the matching target image information 2811 outputted from the matching image information computation unit 2805. By this inverse transformation, the positioning computation unit 2807 computes corresponding point coordinates in the omnidirectional images 2810a to 2810d. In addition, as in Embodiment 2, the positioning computation unit 2807 obtains matching source coordinates using the matching source image information 2812. From these two coordinate values (the matching source coordinates and the corresponding point coordinates), the positioning computation unit 2807 computes two vectors directed to the subject by the below-mentioned positioning computation method, according to the calibration data. The positioning computation unit 2807 specifies a three-dimensional position of the subject from the two vectors based on the principle of triangulation, and outputs the specified three-dimensional position as a positioning result.

Figure 27:
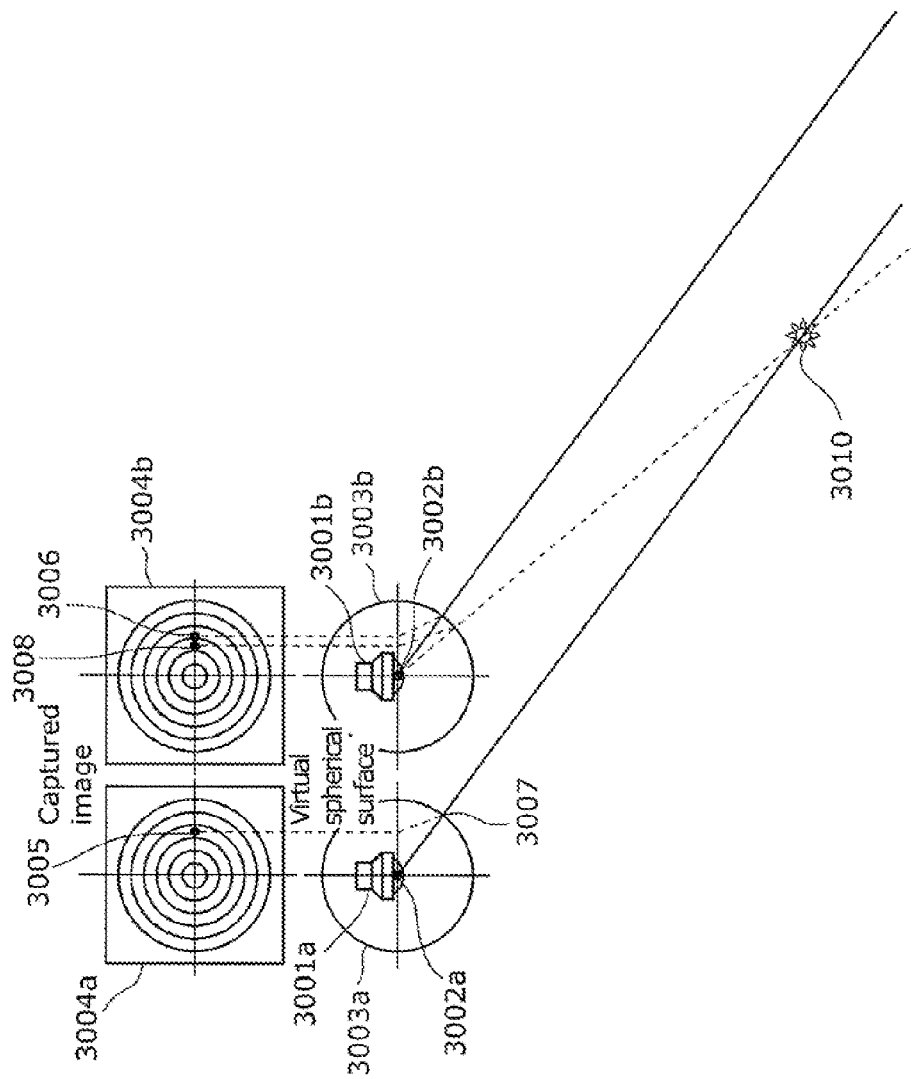
FIG. 27 is a conceptual diagram showing positioning vector computation in Embodiment 6 of the present invention.

The following describes the matching image information computation method in the matching image information computation unit 2805, with reference to FIG. 27. FIG. 27 is a schematic diagram for describing positioning vector computation in Embodiment 6 of the present invention.

Two fisheye lenses 3001a and 3001b out of the plurality of fisheye lenses, virtual viewpoints 3002a and 3002b of the respective fisheye lenses 3001a and 3001b, and virtual spherical surfaces 3003a and 3003b described with reference to FIG. 25 are shown in FIG. 27. Captured images 3004a and 3004b of the respective fisheye lenses 3001a and 3001b, a subject designation point 3005, an infinite point image point 3006, a virtual spherical surface intersection point 3007, an omnidirectional image corresponding point 3008, and a subject 3010 are shown in FIG. 27, too.

Consider the case where the subject designation point 3005 is given in the captured image 3004a of the fisheye lens 3001a.

Here, a three-dimensional coordinate system (X, Y, Z) of the fisheye lens is set so that the Z axis is in an optical axis direction of the lens, the X and Y axes are on a plane perpendicular to the optical axis, and the x and y axes of an image coordinate system (x, y) of the captured image are parallel to the X and Y axes of the three-dimensional coordinate system of the fisheye lens. In this case, a direction angle θ of image coordinates $(x_t, y_t)$ of the subject designation point 3005 in a reference direction (e.g. the x axis direction) is given by the following expression.

$$\theta = \tan^{-1}\left(\frac{y_t}{x_t}\right).$$ [Math. 14]

Meanwhile, from FIG. 25, a distance from a center of the captured image 3004a to the image coordinates $(x_t, y_t)$ of the subject designation point 3005 is computed as follows.

$$\sqrt{x_1^2 + y_1^2}$$ [Math. 15]

This enables an inclination angle φ from the optical axis to be computed. A vector passing through the subject 3010 is determined from θ, φ, and the virtual viewpoint 3002a. The infinite point image point 3006 in the fisheye lens 3001b is a point in the captured image 3004b with coincident θ and φ. In the case where fisheye lenses of the same property are arranged in the same direction, the infinite point image point 3006 coincides with the coordinates of the subject designation point 3005, and therefore the image coordinates of the infinite point image point 3006 are also $(x_t, y_t)$. An epipolar plane is a plane that includes the virtual viewpoint 3002a, the virtual viewpoint 3002b, and the subject 3010. Since the three-dimensional coordinates of the subject 3010 are not computed yet, the epipolar plane can be regarded as a plane that includes an arbitrary point on a straight line connecting the virtual viewpoint 3002a and the subject 3010, for example, the virtual spherical surface intersection point 3007 at which the straight line intersects with the virtual spherical surface.

A normal vector of the epipolar plane, which is necessary for generating the images used for matching, is obtained by a cross product of a vector from the virtual viewpoint 3002a to the virtual spherical surface intersection point 3007 and a vector from the virtual viewpoint 3002a to the virtual viewpoint 3002b.

The normal vector of the epipolar plane, the image coordinates of the infinite point image point 3006, a fisheye camera number, and the like are outputted to the matching target image generation unit 2804 as the matching target image information 2811 in FIG. 26. Moreover, the normal vector of the epipolar plane, the image coordinates of the subject designation point 3005, and the like are outputted to the matching source image generation unit 2803 as the matching source image information 2812 in FIG. 26.

The following describes the positioning computation method in the positioning computation unit 2807, with reference to FIG. 27. The omnidirectional image corresponding point 3008 in FIG. 27 is a corresponding point for the subject designation point 3005, i.e. a point obtained by returning matching target image coordinates computed by image matching into the omnidirectionally captured image 3004b. A direction of incident light can be determined from image coordinates of this omnidirectional image corresponding point 3008. The subject 3010 is present on a straight line in this direction passing through the virtual viewpoint 3002b. As mentioned earlier, the subject 3010 is present on the straight line connecting the virtual viewpoint 3002a and the virtual spherical surface intersection point 3007. Accordingly, the positioning computation unit 2807 can determine the three-dimensional coordinates of the subject 3010, as an intersection point of these two straight lines passing through the subject 3010.

Figure 28:
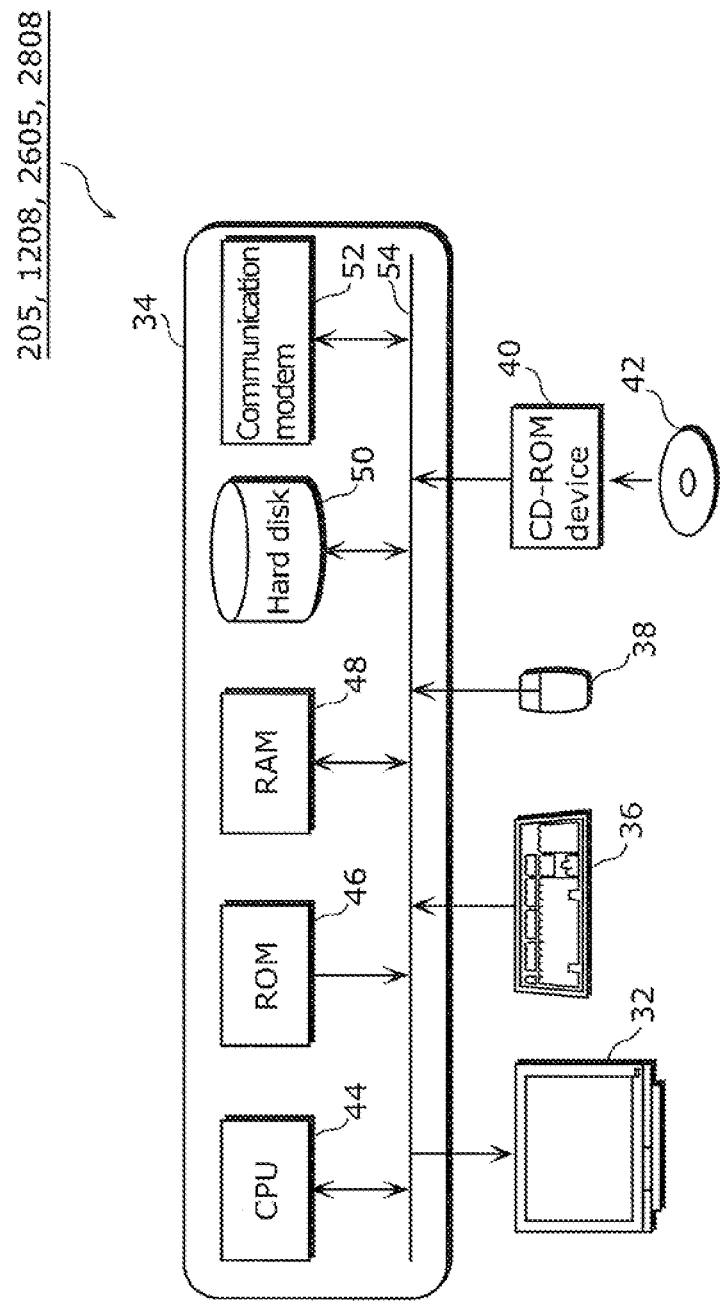
FIG. 28 is a block diagram showing a hardware structure of a computer system for realizing the omnidirectional imaging system in each of Embodiments 1 to 6 of the present invention.
Figure 29:
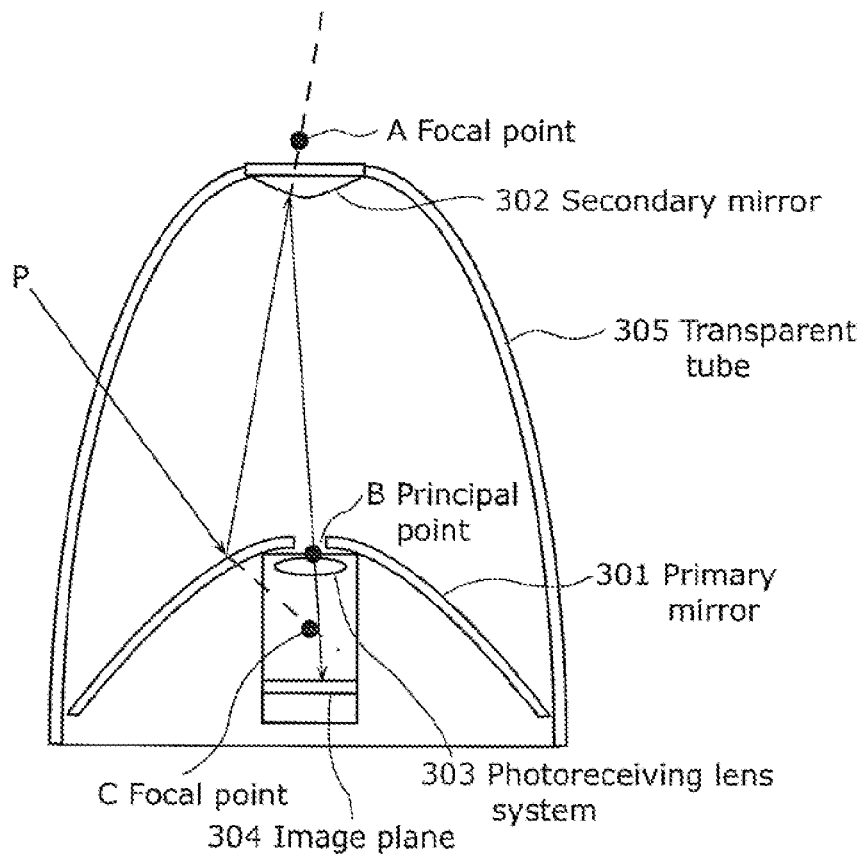
FIG. 29 is a diagram showing a structure of a conventional omnidirectional imaging system described in PTL 1.
Figure 30:
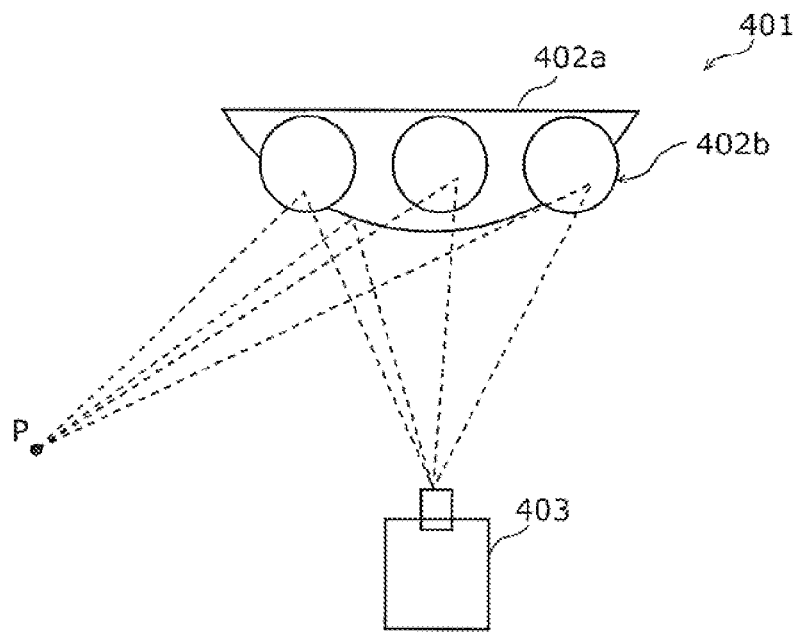
FIG. 30 is a diagram showing a structure of a conventional omnidirectional imaging system described in PTL 2.
Figure 31:
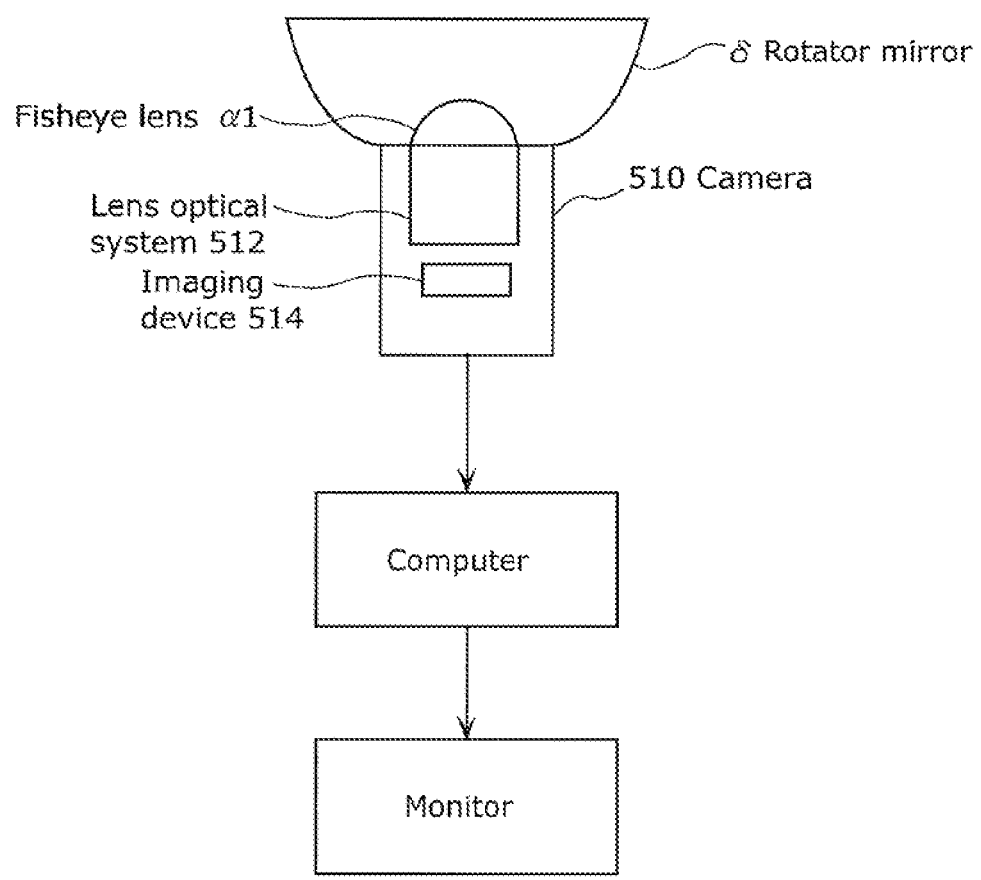
FIG. 31 is a diagram showing a structure of a conventional omnidirectional imaging system described in PTL 3.

The blind spot supplementation unit, the positioning unit, and the like included in the omnidirectional imaging system described in each of Embodiments 1 to 6 can also be realized by a computer. FIG. 28 is a block diagram showing a hardware structure of a computer system that realizes the blind spot supplementation unit, the positioning unit, and the like included in the omnidirectional imaging system.

The blind spot supplementation unit, the positioning unit, and the like included in the omnidirectional imaging system include a computer 34, a keyboard 36 and a mouse 38 for providing instructions to the computer 34, a display 32 for presenting information of a computation result and the like of the computer 34, and a CD-ROM (Compact Disc-Read Only Memory) device 40 and a communication modem (not shown) for reading a program executed by the computer 34.

The program for the processing performed by the blind spot supplementation unit, the positioning unit, and the like included in the omnidirectional imaging system is stored in a CD-ROM 42 which is a computer readable medium and read by the CD-ROM device 40, or read by a communication modem 52 via a computer network.

The computer 34 includes a CPU (Central Processing Unit) 44, a ROM (Read Only Memory) 46, a RAM (Random Access Memory) 48, a hard disk 50, the communication modem 52, and a bus 54.

The CPU 44 executes the program read by the CD-ROM device 40 or the communication modem 52. The ROM 46 stores a program and data necessary for the operation of the computer 34. The RAM 48 stores data such as parameters during program execution. The hard disk 50 stores a program, data, and so on. The communication modem 52 communicates with other computer(s) via the computer network. The bus 54 connects the CPU 44, the ROM 46, the RAM 48, the hard disk 50, the communication modem 52, the display 32, the keyboard 36, the mouse 38, and the CD-ROM device 40 to each other.

The components constituting each of the above-mentioned apparatuses may be partly or wholly implemented on one system LSI (Large Scale Integrated Circuit). The system LSI is an ultra-multifunctional LSI produced by integrating a plurality of components on one chip, and is actually a computer system that includes a microprocessor, a ROM, a RAM, and the like. A computer program is stored in the RAM. Functions of the system LSI can be achieved by the microprocessor operating in accordance with the computer program.

The components constituting each of the above-mentioned apparatuses may be partly or wholly realized by an IC card or a single module that is removably connectable to the apparatus. The IC card or the module is a computer system that includes a microprocessor, a ROM, a RAM, and the like. The IC card or the module may include the above-mentioned ultra-multifunctional LSI. Functions of the IC card or the module can be achieved by the microprocessor operating in accordance with the computer program. The IC card or the module may be tamper resistant.

The present invention may also be the method described above. The present invention may also be a computer program that realizes the method by a computer. The present invention may also be a digital signal corresponding to the computer program.

The present invention may also be a computer-readable recording medium, such as a flexible disk, a hard disk, a CD-ROM, an MO, a DVD, a DVD-ROM, a DVD-RAM, a BD (Blu-ray Disc®), a USB memory, a memory card such as an SD card, or a semiconductor memory, on which the computer program or the digital signal is recorded. Conversely, the present invention may be the digital signal recorded on such a recording medium.

The present invention may also be the computer program or the digital signal transmitted via an electric communication line, a wired or wireless communication line, a network such as the Internet, data broadcasting, and the like.

The present invention may also be a computer system that includes a microprocessor and a memory. In this case, the computer program may be stored in the memory, with the microprocessor operating in accordance with the computer program.

The computer program or the digital signal may be provided to another independent computer system by distributing the recording medium on which the computer program or the digital signal is recorded, or by transmitting the computer program or the digital signal via the network and the like. The independent computer system may then execute the computer program or the digital signal to function as the present invention.

The above embodiments and variations may be freely combined.

The embodiments disclosed herein are to be considered as in all aspects illustrative and not restrictive. The scope of the present invention is defined by the claims rather than by the foregoing description, and all modifications within the scope of the claims and within the meaning and scope of equivalence of the claims are intended to be included in the scope of the present invention.

INDUSTRIAL APPLICABILITY

The omnidirectional imaging system according to the present invention is capable of obtainment of an image with no blind spot area and positioning while ensuring a wide field of view, and so is useful as an omnidirectional camera for surveillance and the like. The omnidirectional imaging system according to the present invention is also applicable to human trajectory detection and the like.

REFERENCE SIGNS LIST

32 Display
34 Computer
36 Keyboard
38 Mouse
40 CD-ROM device
42 CD-ROM
44 CPU
46 ROM
48 RAM
50 Hard disk
52 Communication modem
54 Bus
101, 301, 803a, 903a, 1001, 1301, 1701 Primary mirror
102, 302, 803b, 903b, 1002, 1302, 1702 Secondary mirror
103, 1003, 1303, 1703, 2103 Substantially plane mirror
104, 202, 510, 1004, 1202, 1704, 2104, 2411 to 2414, 2602a to 2602d, 2802a to 2802d Camera
105, 1305 Viewpoint
201, 1201, 2601a to 2601d, 2801a to 2801d Imaging optical system
203, 2603 Image synthesis unit
204, 2604 Synthesis parameter computation unit
205, 2605 Blind spot supplementation unit
210, 1210, 2610a to 2610d, 2810a to 2810d Omnidirectional image
303 Photoreceiving lens system
304 Image plane
305 Transparent tube
401 Omnidirectional mirror
402a Hemispherical mirror
402b Spherical mirror
403 Imaging device
512 Lens optical system
514 Imaging device
600, 700, 1400, 1500, 1600, 1800, 1900, 2000 Primary mirror image area
601, 701 Blind spot area
602 to 605, 702 to 705, 1402 to 1405, 1502 to 1505, 1602 to 1605, 1802 to 1807, 1902 to 1907, 2002 to 2007 Secondary mirror image area
606 Partial image area of secondary mirror image area 602
606' Part of blind spot area 601 (corresponding to partial image area 606)
607 Partial image area of secondary mirror image area 603
607' Part of blind spot area 601 (corresponding to partial image area 607)
608 Partial image area of secondary mirror image area 604
608' Part of blind spot area 601 (corresponding to partial image area 608)
609 Partial image area of secondary mirror image area 605
609' Part of blind spot area 601 (corresponding to partial image area 609)
711 Partial image area of secondary mirror image area 702
711' Part of blind spot area 701 (corresponding to partial image area 711)
712 Partial image area of secondary mirror image area 704
712' Part of blind spot area 701 (corresponding to partial image area 712)
801a Outer focal point of primary mirror 803a
801b Outer focal point of secondary mirror 803b
802a Inner focal point of primary mirror 803a
802b Inner focal point of secondary mirror 803b
804a Primary mirror effective radius
804b Secondary mirror effective radius
805a, 905a Primary mirror effective edge point
805b, 1105b Secondary mirror effective edge point
806, 906, 1106 Secondary mirror vertex
901, 1101 Primary mirror and secondary mirror outer focal point
902a, 1310 Primary mirror inner focal point
907, 1107 Secondary mirror inclination angle
908, 1108 Inner limit angle
909 Lower limit straight line
910 Inner limit straight line
1102b, 1312 Secondary mirror inner focal point
1111 Outer reference straight line
1112 Outer reference angle
1114 Secondary mirror angle
1203, 2803 Matching source image generation unit
1204, 2804 Matching target image generation unit
1205, 2805 Matching image information computation unit
1206, 2806 Image matching unit
1207, 2807 Positioning computation unit
1208, 2808 Positioning unit
1211, 2811 Matching target image information
1212, 2812 Matching source image information
1306 Image plane of camera
1307, 3005 Subject designation point
1308 Substantially plane mirror intermediate point
1309 Primary mirror intermediate point
1311, 3010 Subject
1313 Secondary mirror intermediate point
1314 Substantially plane mirror intermediate point
1315, 3006 Infinite point image point
1316, 3008 Omnidirectional image corresponding point
1317 Substantially plane mirror intermediate point
1318 Secondary mirror intermediate point
1401 Blind spot area of primary mirror image area 1400
1406 Partial image area of secondary mirror image area 1402
1406' Part of blind spot area 1401 (corresponding to partial image area 1406)
1407 Partial image area of secondary mirror image area 1403
1407' Part of blind spot area 1401 (corresponding to partial image area 1407)
1408 Partial image area of secondary mirror image area 1404
1408' Part of blind spot area 1401 (corresponding to partial image area 1408)
1409 Partial image area of secondary mirror image area 1405
1409' Part of blind spot area 1401 (corresponding to partial image area 1409)

1501 Blind spot area of primary mirror image area 1500
1511 Partial image area of secondary mirror image area 1502
1511' Part of blind spot area 1501 (corresponding to partial image area 1511)
1512 Partial image area of secondary mirror image area 1504
1512' Part of blind spot area 1501 (corresponding to partial image area 1512)
1601 Blind spot area of primary mirror image area 1600
1606 Partial image area of secondary mirror image area 1602
1606' Part of blind spot area 1601 (corresponding to partial image area 1606)
1607 Partial image area of secondary mirror image area 1603
1607' Part of blind spot area 1601 (corresponding to partial image area 1607)
1608 Partial image area of secondary mirror image area 1604
1608' Part of blind spot area 1601 (corresponding to partial image area 1608)
1609 Partial image area of secondary mirror image area 1605
1609' Part of blind spot area 1601 (corresponding to partial image area 1609)
1801 Blind spot area of primary mirror image area 1800
1808 Partial image area of secondary mirror image area 1802
1808' Part of blind spot area 1801 (corresponding to partial image area 1808)
1809 Partial image area of secondary mirror image area 1803
1809' Part of blind spot area 1801 (corresponding to partial image area 1809)
1810 Partial image area of secondary mirror image area 1804
1810' Part of blind spot area 1801 (corresponding to partial image area 1810)
1811 Partial image area of secondary mirror image area 1805
1811' Part of blind spot area 1801 (corresponding to partial image area 1811)
1812 Partial image area of secondary mirror image area 1806
1812' Part of blind spot area 1801 (corresponding to partial image area 1812)
1813 Partial image area of secondary mirror image area 1807
1813' Part of blind spot area 1801 (corresponding to partial image area 1813)
1901 Blind spot area of primary mirror image area 1900
1909 Partial image area of secondary mirror image area 1903
1909' Part of blind spot area 1901 (corresponding to partial image area 1909)
1911 Partial image area of secondary mirror image area 1905
1911' Part of blind spot area 1901 (corresponding to partial image area 1911)
1913 Partial image area of secondary mirror image area 1907
1913' Part of blind spot area 1901 (corresponding to partial image area 1913)
2001 Blind spot area of primary mirror image area 2000
2008 Partial image area of secondary mirror image area 2002
2008' Part of blind spot area 2001 (corresponding to partial image area 2008)
2009 Partial image area of secondary mirror image area 2003
2009' Part of blind spot area 2001 (corresponding to partial image area 2009)
2010 Partial image area of secondary mirror image area 2004
2010' Part of blind spot area 2001 (corresponding to partial image area 2010)
2011 Partial image area of secondary mirror image area 2005
2011' Part of blind spot area 2001 (corresponding to partial image area 2011)
2012 Partial image area of secondary mirror image area 2006
2012' Part of blind spot area 2001 (corresponding to partial image area 2012)
2013 Partial image area of secondary mirror image area 2007
2013' Part of blind spot area 2001 (corresponding to partial image area 2013)
2102 Hyperbolic mirrors
2201, 2301, 2701 to 2704, 2907 Captured image
2202 to 2205, 2302 to 2305 Hyperbolic mirror image area
2206 Image of camera itself
2307 Partial image area of hyperbolic mirror image area 2302
2307' Part of blind spot supplemented image 2311 (corresponding to partial image area 2307)
2308 Partial image area of hyperbolic mirror image area 2303
2308' Part of blind spot supplemented image 2311 (corresponding to partial image area 2308)
2309 Partial image area of hyperbolic mirror image area 2304
2309' Part of blind spot supplemented image 2311 (corresponding to partial image area 2309)
2310 Partial image area of hyperbolic mirror image area 2305
2310' Part of blind spot supplemented image 2311 (corresponding to partial image area 2310)
2311, 2731 Blind spot supplemented image
2401 to 2404, 2901, α1 Fisheye lens
2501 to 2504 Image captured by fisheye lens 2401 and camera 2411
2511 to 2514, 2711 to 2714 Omnidirectional image area
2721 Partial image area of omnidirectional image area 2711
2721' Part of blind spot supplemented image 2731 (corresponding to partial image area 2721)
2722 Partial image area of omnidirectional image area 2712
2722' Part of blind spot supplemented image 2731 (corresponding to partial image area 2722)
2723 Partial image area of omnidirectional image area 2713
2723' Part of blind spot supplemented image 2731 (corresponding to partial image area 2723)
2724 Partial image area of omnidirectional image area 2714
2724' Part of blind spot supplemented image 2731 (corresponding to partial image area 2724)
2902 Virtual viewpoint of fisheye lens
2903 Virtual spherical surface
2904 to 2906 Incident light
2908 Projective point for incident light 2904

2909 Projective point for incident light 2905
2910 Projective point for incident light 2906
3001a Fisheye lens
3001b Fisheye lens
3002a Virtual viewpoint of fisheye lens
3002b Virtual viewpoint of fisheye lens
3003a Virtual spherical surface of fisheye lens
3003b Virtual spherical surface of fisheye lens
3004a Captured image of fisheye lens
3004b Captured image of fisheye lens
3007 Virtual spherical surface intersection point
δ Rotator mirror

The invention claimed is:

1. An omnidirectional imaging system comprising:
a primary mirror including a hyperbolic mirror;
a plurality of secondary mirrors arranged around said primary mirror, each of said plurality of secondary mirrors including a hyperbolic mirror; and
a camera that captures an image reflected by said primary mirror and images reflected by said plurality of secondary mirrors,
wherein a hyperboloid of said primary mirror and hyperboloids of said plurality of secondary mirrors have a substantially coincident outer focal point,
said camera is placed so that a viewpoint of said camera substantially coincides with the outer focal point of the hyperboloid of said primary mirror and the hyperboloids of said plurality of secondary mirrors, the viewpoint of said camera being an entrance pupil position of a lens attached to said camera, and
when (i) a hyperbolic equation representing a shape of the hyperboloid of said primary mirror is $$\frac{(z-c_m)^2}{a_m^2} - \frac{x^2+y^2}{b_m^2} = 1$$
$$c_m^2 = a_m^2 + b_m^2$$

where $a_m$, $b_m$, and $c_m$ are hyperbolic coefficients, and (ii) a point, from among points on an outside diameter of said primary mirror, at which the outside diameter is maximum, is $$P_{r_m} = (r_m, z_m)(r_m > 0)$$

where a central axis of said primary mirror and a central axis of a first secondary mirror that is one of said plurality of secondary mirrors are included in an X-Z plane in which the central axis of said primary mirror is set as a Z axis and the outer focal point of the hyperboloid of said primary mirror and the hyperboloid of said first secondary mirror is set as an origin, said first secondary mirror is placed so that a vertex position $T(x_T, z_T)$ of said first secondary mirror satisfies $$z_T \geq \frac{1}{r_m}\left(\frac{a_m}{b_m}\sqrt{b_m^2 + r_m^2} - c_m\right)x_T + 2c_m.$$

2. The omnidirectional imaging system according to claim 1, further comprising
a substantially plane mirror in a substantially plane shape, said substantially plane mirror being placed between the outer focal point of the hyperboloid of said primary mirror and the hyperboloids of said plurality of secondary mirrors and an inner focal point of the hyperboloid of said primary mirror and the hyperboloids of said plurality of secondary mirrors,
wherein said camera is placed so that the viewpoint of said camera is at a position symmetrical to the outer focal point of the hyperboloid of said primary mirror and the hyperboloids of said plurality of secondary mirrors about said substantially plane mirror, and
external light is reflected by said primary mirror or said plurality of secondary mirrors and further reflected by said substantially plane mirror, and as a result enters said camera.

3. The omnidirectional imaging system according to claim 1,
wherein when (i) a hyperbolic equation representing a shape of the hyperboloid of said primary mirror is $$\frac{(z-c_m)^2}{a_m^2} - \frac{x^2+y^2}{b_m^2} = 1$$
$$c_m^2 = a_m^2 + b_m^2$$

where $a_m$, $b_m$, and $c_m$ are hyperbolic coefficients, and (ii) a point, from among points on an outside diameter of said primary mirror, at which the outside diameter is maximum, is $$P_{r_m} = (r_m, z_m)(r_m > 0)$$

where a central axis of said primary mirror and a central axis of a second secondary mirror that is one of said plurality of secondary mirrors are included in an X-Z plane in which the central axis of said primary mirror is set as a Z axis and the outer focal point of the hyperboloid of said primary mirror and the hyperboloid of said second secondary mirror is set as an origin, said second secondary mirror is placed so that a vertex position $T(x_T, z_T)$ of said second secondary mirror satisfies $$z_T \leq \frac{1}{\tan\theta_1}x_T$$

where θ is an angle formed by the central axis of said primary mirror and the central axis of said second secondary mirror, and $\theta_1$ is θ when the point at which the outside diameter is maximum is present on the central axis of said second secondary mirror.

4. The omnidirectional imaging system according to claim 1, further comprising
a blind area supplementation unit configured to generate a supplemental synthetic image using the images reflected by said plurality of secondary mirrors, the supplemental synthetic image being an image for supplementing a blind area in the image reflected by said primary mirror.

5. The omnidirectional imaging system according to claim 4,
wherein said blind area supplementation unit is configured to generate an arbitrary viewpoint image using the images reflected by said plurality of secondary mirrors, and generate the supplemental synthetic image using the arbitrary viewpoint image, the arbitrary viewpoint image having a viewpoint at an inner focal point of said primary mirror.

6. The omnidirectional imaging system according to claim 1, further comprising
a positioning unit configured to compute a corresponding point for a designation point by image matching, and to position a subject from coordinates of the designation point and coordinates of the corresponding point, the designation point being a point that is designated in the image reflected by said primary mirror and corresponds to the subject, and the corresponding point being a point that is in an image reflected by one of said plurality of secondary mirrors and corresponds to the subject.

7. The omnidirectional imaging system according to claim 6, further comprising
a blind area supplementation unit configured to generate a supplemental synthetic image using an image reflected by at least one part of said plurality of secondary mirrors, the supplemental synthetic image being an image for supplementing a blind area in the image reflected by said primary mirror.

8. The omnidirectional imaging system according to claim 7,
wherein said blind area supplementation unit is configured to generate an arbitrary viewpoint image using an image reflected by at least one part of said plurality of secondary mirrors, to generate the supplemental synthetic image for supplementing the blind area, the arbitrary viewpoint image having a viewpoint at an inner focal point of said primary mirror.

9. The omnidirectional imaging system according to claim 8,
wherein said blind area supplementation unit is configured to record a correspondence relationship between images reflected by secondary mirrors out of said plurality of secondary mirrors and used when generating the supplemental synthetic image and areas in the supplemental synthetic image, and
said positioning unit is configured to compute a first point and a second point by image matching, and to position, from the first point and the second point, a subject corresponding to a designation point designated in the supplemental synthetic image, the first point being a point that is in an image reflected by a first secondary mirror out of said plurality of secondary mirrors and corresponds to the subject, the second point being a point that is in an image reflected by one of said plurality of secondary mirrors other than said first secondary mirror and corresponds to the subject, and said first secondary mirror corresponding to an area, in the supplemental synthetic image, that includes the designation point.

10. The omnidirectional imaging system according to claim 7,
wherein said blind area supplementation unit is configured to record a correspondence relationship between images reflected by secondary mirrors out of said plurality of secondary mirrors and used when generating the supplemental synthetic image and areas in the supplemental synthetic image, and
said positioning unit is configured to compute a first point and a second point by image matching, and to position, from the first point and the second point, a subject corresponding to a designation point designated in the supplemental synthetic image, the first point being a point that is in an image reflected by a first secondary mirror out of said plurality of secondary mirrors and corresponds to the subject, the second point being a point that is in an image reflected by one of said plurality of secondary mirrors other than said first secondary mirror and corresponds to the subject, and said first secondary mirror corresponding to an area, in the supplemental synthetic image, that includes the designation point.

11. The omnidirectional imaging system according to claim 1, further comprising
a positioning unit configured to compute a corresponding point for a designation point by image matching, and to position a subject from coordinates of the designation point and coordinates of the corresponding point, the designation point being a point that is designated in an image reflected by one of said plurality of secondary mirrors and corresponds to the subject, and the corresponding point being a point that is in the image reflected by said primary mirror and corresponds to the subject.

12. The omnidirectional imaging system according to claim 1, further comprising
a positioning unit configured to compute a corresponding point for a designation point by image matching, and to position a subject from coordinates of the designation point and coordinates of the corresponding point, the designation point being a point that is designated in an image reflected by one of said plurality of secondary mirrors and corresponds to the subject, and the corresponding point being a point that is in an image reflected by one of said plurality of secondary mirrors other than said secondary mirror and corresponds to the subject.

13. An omnidirectional imaging system comprising: a plurality of hyperbolic mirrors each having an inclined central axis; and a camera that captures images reflected by said plurality of hyperbolic mirrors, wherein the central axis of each of said plurality of hyperbolic mirrors is inclined so that said plurality of hyperbolic mirrors have a substantially coincident outer focal point, said camera is placed so that a viewpoint of said camera substantially coincides with the outer focal point of said plurality of hyperbolic mirrors, the viewpoint of said camera being an entrance pupil position of a lens attached to said camera, and the shape of hyperbolic mirror is represented by:

$$\frac{(z-c_{s1})^2}{a_{s1}^2} - \frac{x^2+y^2}{b_{s1}^2} = 1$$
$$c_{s1}^2 = a_{s1}^2 + b_{s1}^2$$

where coordinates of an inner focal point of the hyperbolic mirrors are $(0, 0, 2c_{s1})$, coordinates of a vertex of the hyperbolic mirror is $(0, 0, c_{s1}+a_{s1})$, and $a_{s1}$, $b_{s1}$, and $c_{s1}$ are coefficients of the hyperboloid of the hyperbolic mirror.

14. The omnidirectional imaging system according to claim 13, further comprising
a substantially plane mirror in a substantially plane shape, said substantially plane mirror being placed between the outer focal point of said plurality of hyperbolic mirrors substantially coinciding with the viewpoint of said camera and an inner focal point of said plurality of hyperbolic mirrors,
wherein said camera is placed so that the viewpoint of said camera is at a position symmetrical to the outer focal point of said plurality of hyperbolic mirrors about said substantially plane mirror, and
external light is reflected by each of said plurality of hyperbolic mirrors and further reflected by said substantially plane mirror, and as a result enters said camera.

15. The omnidirectional imaging system according to claim 13, further comprising
a blind area supplementation unit configured to generate a supplemental synthetic image by synthesizing an image reflected by at least one part of said plurality of hyperbolic mirrors, the supplemental synthetic image being an image with no blind area.

16. The omnidirectional imaging system according to claim 15,
wherein said blind area supplementation unit is configured to generate the supplemental synthetic image, by supplementing a blind area in an image reflected by one of said plurality of hyperbolic mirrors using an image reflected by at least one part of said plurality of hyperbolic mirrors other than said hyperbolic mirror.

17. The omnidirectional imaging system according to claim 15,
wherein said blind area supplementation unit is configured to generate an arbitrary viewpoint image using an image reflected by at least one part of said plurality of hyperbolic mirrors, and generate the supplemental synthetic image using the arbitrary viewpoint image, the arbitrary viewpoint image having a viewpoint at a single viewpoint position of a hyperbolic mirror that is subjected to supplementation among said plurality of hyperbolic mirrors.

18. The omnidirectional imaging system according to claim 13, further comprising
a positioning unit configured to compute a corresponding point for a designation point by image matching, and to position a subject from coordinates of the designation point and coordinates of the corresponding point, the designation point being a point that is designated in an image reflected by one of said plurality of hyperbolic mirrors and corresponds to the subject, and the corresponding point being a point that is in an image reflected by one of said plurality of hyperbolic mirrors other than said hyperbolic mirror and corresponds to the subject.

19. The omnidirectional imaging system according to claim 18, further comprising
a blind area supplementation unit configured to generate a supplemental synthetic image by synthesizing an image reflected by at least one part of said plurality of hyperbolic mirrors, the supplemental synthetic image being an image with no blind area.

20. The omnidirectional imaging system according to claim 19,
wherein said blind area supplementation unit is configured to generate an arbitrary viewpoint image using an image reflected by at least one part of said plurality of hyperbolic mirrors, and generate the supplemental synthetic image using the arbitrary viewpoint image, the arbitrary viewpoint image having a viewpoint of an omnidirectional image.

21. The omnidirectional imaging system according to claim 19,
wherein said blind area supplementation unit is configured to record a correspondence relationship between images reflected by hyperbolic mirrors out of said plurality of hyperbolic mirrors and used when generating the supplemental synthetic image and areas in the supplemental synthetic image, and
said positioning unit is configured to compute a first point and a second point by image matching, and position, from the first point and the second point, a subject corresponding to a designation point designated in the supplemental synthetic image, the first point being a point that is in an image reflected by a first hyperbolic mirror out of said plurality of hyperbolic mirrors and corresponds to the subject, the second point being a point that is in an image reflected by one of said plurality of hyperbolic mirrors other than said first hyperbolic mirror and corresponds to the subject, and said first hyperbolic mirror corresponding to an area, in the supplemental synthetic image, that includes the designation point.

22. The omnidirectional imaging system according to claim 19,
wherein said blind area supplementation unit is configured to supplement a blind area in an image reflected by one of said plurality of hyperbolic mirrors, using an image reflected by at least one part of said plurality of hyperbolic mirrors other than said hyperbolic mirror.

23. The omnidirectional imaging system according to claim 22,
wherein said blind area supplementation unit is configured to generate an arbitrary viewpoint image using an image reflected by at least one part of said plurality of hyperbolic mirrors, and generate the supplemental synthetic image using the arbitrary viewpoint image, the arbitrary viewpoint image having a viewpoint at a single viewpoint position of said hyperbolic mirror that is subjected to the supplementation among said plurality of hyperbolic mirrors.

24. The omnidirectional imaging system according to claim 22,
wherein said blind area supplementation unit is configured to record a correspondence relationship between images reflected by hyperbolic mirrors out of said plurality of hyperbolic mirrors and used when generating the supplemental synthetic image and areas in the supplemental synthetic image, and
said positioning unit is configured to compute a first point and a second point by image matching, and to position, from the first point and the second point, a subject corresponding to a designation point designated in the supplemental synthetic image, the first point being a point that is in an image reflected by a first hyperbolic mirror out of said plurality of hyperbolic mirrors and corresponds to the subject, the second point being a point that is in an image reflected by one of said plurality of hyperbolic mirrors other than said first hyperbolic mirror and corresponds to the subject, and said first hyperbolic mirror corresponding to an area, in the supplemental synthetic image, that includes the designation point.

* * * * *